(12) United States Patent
Hayashi et al.

(10) Patent No.: US 6,400,671 B2
(45) Date of Patent: Jun. 4, 2002

(54) OPTICAL HEAD DEVICE

(75) Inventors: Hideki Hayashi, Nara; Tatsuo Ito, Osaka; Yoshiaki Komma, Hirakata; Hiroaki Yamamoto, Hyogo; Seiji Nishino, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/897,811

(22) Filed: Jul. 2, 2001

Related U.S. Application Data

(62) Division of application No. 09/427,826, filed on Oct. 27, 1999, now Pat. No. 6,278,670.

(30) Foreign Application Priority Data

Oct. 27, 1998 (JP) .......................................... 10-304875

(51) Int. Cl.$^7$ ................................................. G11B 7/00
(52) U.S. Cl. ............................. 369/112.12; 369/109.02; 369/44.41
(58) Field of Search ........................... 369/44.11, 44.12, 369/44.23, 44.41, 44.42, 109.01, 109.02, 112.01, 112.03, 112.12

(56) References Cited

U.S. PATENT DOCUMENTS

| 4,945,529 A | * | 7/1990 | Ono et al. ............. 369/112.12 |
| 5,293,038 A | | 3/1994 | Kadowaki et al. |
| 5,648,951 A | | 7/1997 | Kato et al. |
| 5,757,754 A | | 5/1998 | Yamamoto et al. |
| 5,761,174 A | * | 6/1998 | Takeda et al. ......... 369/112.07 |

\* cited by examiner

Primary Examiner—Muhammad Edun
(74) Attorney, Agent, or Firm—Ratner & Prestia

(57) ABSTRACT

In a photodetector, the minimum size of the photodetection area for detecting a focus error signal from a light beam on the inner radius side of a hologram is made smaller than the minimum diameter of diffracted light beam spots (30, 31) for recording and reproduction, and when a CD is reproduced, a light beam close to the optical axis is made to significantly contribute to the focus error signal and the minimum size of the photodetection area for detecting the focus error signal from a light beam from the peripheral side of the hologram is made larger than the minimum diameter of diffracted light beam spots (130, 131) for recording and reproduction, whereby the focus error signal is made equal to the normal focus error signal when a DVD is reproduced, so that the focus offset variation caused when the base material thickness varies can be reduced.

4 Claims, 15 Drawing Sheets

Two-layer focus S letter by pattern 341

Two-layer focus S letter by pattern 342

OPTICAL HEAD DEVICE

This application is a Divisional of U.S. Ser. No. 09/427,826, filed Oct. 27, 1999, now U.S. Pat. No. 6,278,670.

BACKGROUND OF THE INVENTION

1. Field of the Invention

The present invention relates to an optical head device.

2. Description of the Related Art

An optical memory technology using optical disks having pit patterns as high-density and large-capacity recording media has increasing applications such as digital audio disks, video disks, document file disks and data files. According to the optical memory technology, information is recorded onto and reproduced from optical disks with high precision and reliability through minutely converged light beams.

The precision and stability of the recording and reproduction depend entirely on the optical system.

Basic functions of the optical head device being the main part of the optical system are broadly divided into convergence to form diffraction limited minute spots, focus control and tracking control of the optical system, and detection of pit signals. These functions are realized by combinations of various types of optical systems and photoelectric conversion detection methods according to the purposes and uses thereof.

On the other hand, in recent years, high-density and large-capacity optical disks called DVDs have been put to practical use and spotlighted as information media capable of handling a large amount of information such as moving images. In DVD optical disks, in order to increase the recording density, the pit size on the information recording surface is small compared to compact disks (hereinafter, abbreviated as CDs) being conventional optical disks. Therefore, in the optical head devices for performing recording and reproduction of DVD optical disks, the wavelength of the light source for deciding the spot diameter and the numerical aperture (hereinafter, abbreviated as NA) of the converging lens are different from those in the case of CDs. In the case of CDs, the wavelength of the light source is substantially 0.78 μm and the NA is substantially 0.45, whereas in the case of DVD optical disks, the wavelength of the light source is substantially 0.63 to 0.65 μm and the NA is substantially 0.6. Therefore, to perform recording and reproduction of two kinds of optical disks of CDs and DVD optical disks by use of one optical disk drive, an optical head device having two optical systems is necessary.

On the other hand, in view of demands for smaller, thinner and lower-cost optical head devices, the trend is to use a common optical system for CDs and DVDs where possible. For example, a method is used in which a light source for DVDs is used as the light source and only as the converging lens, two kinds of converging lenses one of which is for DVD optical disks and the other of which is for CDs are used, or in which the converging lens is also shared and only the NA is mechanically or optically changed so as to be large for DVD optical disks and small for CDs.

Of the above-described optical head devices, the method to optically change the NA of the converging lens will hereinafter be described with reference to the drawings. In the x, y and z coordinates shown in the lower left part of the figures, the same coordinate axes represent the same directions on the figures.

FIG. 8 shows the structure of the optical system of the conventional optical head device. In FIG. 8, reference numeral 1 represents a semiconductor laser with a wavelength of substantially 0.65 μm. The semiconductor laser 1 is disposed so as to emit a light beam polarized in the direction of the x-axis of the x, y and z coordinates shown in the lower left part of FIG. 8. Reference numeral 2 represents the light beam emitted from the semiconductor laser 1. Reference numeral 3 represents a collimator lens that converts the light beam 2 into a parallel light beam. Reference numeral 4 represents a polarization anisotropic hologram disposed so as to transmit a polarized light beam having its plane of polarization within the x-z plane of FIG. 8 and diffract a polarized light beam having its plane of polarization within the y-z plane. The hologram pattern of the polarization anisotropic hologram 4 is formed so that the direction of diffraction is different between the central part and the peripheral part and that the diffracted light beam from the central part is converted into a plurality of light beams having different focus positions. Reference numeral 5 represents a quarter-wave plate that converts a linearly polarized light beam into a circularly polarized light beam. Reference numeral 6 represents an objective lens. The NA of the objective lens 6 is 0.6. Reference numeral 7 represents an optical disk. Reference numeral 9 represents a first diffracted light beam which is a light beam diffracted at the central part of the polarization anisotropic hologram 4. Reference numeral 8 represents a second diffracted light beam which is the other light beam diffracted by the polarization anisotropic hologram 4. The position of convergence of the first diffracted light beam 9 is closer to the collimator lens 3 than that of the second diffracted light beam 8. Reference numeral 10 represents a photodetector comprising a plurality of photodetection areas.

The operation of the optical head device structured as described above will hereinafter be described.

In FIG. 8, first, the light beam 2 emitted from the semiconductor laser 1 is a linearly polarized light beam having its plane of polarization within the x-z plane of the x, y and z coordinates shown in the lower left part of the figure. After converted into a parallel light beam by the collimator lens 3, the light beam 2 is incident on the polarization anisotropic hologram 4. Since the polarization anisotropic hologram 4 transmits a polarized light beam having its plane of polarization within the x-z plane and diffracts a polarized light beam having its plane of polarization within the y-z plane, the light beam 2 is transmitted by the polarization anisotropic hologram 4 as it is and is then converted into a circularly polarized light beam by the quarter-wave plate 5. The circularly polarized light beam is converged by the objective lens 6 to form a minute spot on the information recording surface of the optical disk 7.

However, since the thickness from the substrate surface to the information recording surface is different between CDs and DVD optical disks, although a minute spot with hardly any aberration can be formed when the optical disk 7 is a DVD optical disk, when the optical disk 7 is a CD, a spot sufficient for reproduction of the CD cannot be obtained because of aberration generation.

It is known that for reproduction of CDs, by using only light, of within approximately 0.38 in terms of the NA, of the light passing through the objective lens 6, the aberration generation is reduced and an excellent spot is obtained.

The light reflected at the information recording surface of the optical disk 7 passes through the objective lens 6 and the quarter-wave plate 5 to be converted into a linearly polarized light beam having its plane of polarization within the y-z plane, and is diffracted by the polarization anisotropic hologram 4.

In the polarization anisotropic hologram, the direction of diffraction is different between the area of the central part through which light, of within approximately 0.38 in terms of the NA of the objective lens 6, of the reflected light beam passes, and the area of the peripheral part. The light from the area of the central part becomes the diffracted light beams 9 and 8, and is converged by the collimator lens 3. At this time, the position of convergence is different between the diffracted light beam 9 and the diffracted light beam 8. The diffracted light beam 9 is converged at a position closer to the collimator lens 3 than the diffracted light beam 8.

The diffracted light beams 9 and 8 are incident on the photodetector 10 to be detected. By computing the output of the photodetector 10, a focus error signal is obtained. The focus error signal is obtained by the above-described method irrespective of whether the optical disk 7 is a DVD optical disk or a CD.

For an information signal, the detection method is different according to whether the optical disk 7 is a DVD optical disk or a CD.

That is, in the case of DVD optical disks, the information signal is obtained from all the diffracted light beams diffracted at the area of the central part and the area of the peripheral part of the polarization anisotropic hologram 4.

On the contrary, in the case of CDs, the information signal is obtained from the diffracted light beams 9 and 8 diffracted at the central part of the polarization anisotropic hologram 4.

As described above, in the case of CDs, by using, of the light reflected from the information recording surface, a light beam, with little aberration, of within approximately 0.38 in terms of the NA of the objective lens 6 for detection of the information signal, excellent signal detection is enabled.

Examples of the method of detecting the focus error signal include a known spot size detection (SSD) method disclosed in Japanese Laid-open Patent Application No. Hei 2-185722. This method will be detailed by use of FIGS. 9(a) to 10(c).

FIGS. 9(a) to 9(c) are views of assistance in explaining the method of detecting the focus error signal. In the figures, the same elements as those of FIG. 8 are denoted by the same reference numerals, and descriptions thereof are omitted.

In FIG. 9(a), the position of the information recording surface of the optical disk 7 is on the side of the focus position of the objective lens 6 which side is farther from the objective lens 6. The focus positions of the diffracted light beam 9 and the diffracted light beam 8 are closer to the collimator lens 3.

In FIG. 9(b), the position of the information recording surface of the optical disk 7 coincides with the focus position of the objective lens 6. The focus positions of the diffracted light beam 9 and the diffracted light beam 8 are symmetrical with respect to the surface of the photodetector 10, so that the beam sizes of the diffracted light beams 9 and 8 on the photodetector 10 are the same.

In FIG. 9(c) the position of the information recording surface of the optical disk 7 is on the side of the focus position of the objective lens 6 which side is closer to the objective lens 6. The focus positions of the diffracted light beam 9 and the diffracted light beam 8 are farther from the collimator lens 3.

The spots of the diffracted light beams on the photodetector 10 in the conditions of FIGS. 9(a), 9(b) and 9(c) are shown in FIGS. 10(a), 10(b) and 10(c), respectively.

In FIGS. 10(a) to 10(c), reference numeral 10 represents the photodetector, and reference numerals 8a to 8d and 9a to 9d represent divisional light beams of the diffracted light beam 9 and the diffracted light beam 8 in FIGS. 9(a) to 9(c). This division is performed by dividing the hologram element 4 into areas. Reference numerals 11 to 14 represent some of the detection areas of the photodetector 10. The sum of the outputs of the detection area 11 and the detection area 14 is represented by FE1, and the sum of the outputs of the detection area 12 and the detection area 13 is represented by FE2.

FIG. 10(a) is a view corresponding to FIG. 9(a). In FIG. 10(a), the sizes of the diffracted light beam spots 8a to 8d are smaller than those of the diffracted light beam spots 9a to 9d.

Moreover, FIG. 10(b) is a view corresponding to FIG. 9(b). In FIG. 10(b), the sizes of the diffracted light beam spots 8a to 8d are the same as those of the diffracted light beam spots 9a to 9d.

Moreover, FIG. 10(c) is a view corresponding to FIG. 9(c) In FIG. 10(c), the sizes of the diffracted light beam spots 8a to 8d are larger than those of the diffracted light beam spots 9a to 9d.

Here, the quadrants of the divisional diffracted light beam spots 8a to 8d and 9a to 9d are shown in FIGS. 11(a) to 11(c) being virtually joined for ease of explanation.

FIG. 11(a) is a view corresponding to FIG. 10(a). Reference numerals 15 and 16 represent diffracted light beam spots formed by joining the diffracted light beam spots 8a to 8d and 9a and 9d shown in FIG. 10(a), respectively.

Reference numerals 17 to 22 represent detection areas. The detection area 17 corresponds to the detection area 11 shown in FIG. 10(a). The detection area 18 corresponds to the detection areas 12 and 13. The detection area 19 corresponds to the detection area 14. The detection area 20 corresponds to the detection area 13. The detection area 21 corresponds to the detection areas 11 and 14. The detection area 22 corresponds to the detection area 12.

The focus error signal is obtained by the difference between the outputs FE1 and FE2 of the detection areas (FE1−FE2). The focus error signal is negative in the case of FIG. 11(a), is 0 in the case of FIG. 11(b) and is positive in the case of FIG. 11(c).

Therefore, by moving the objective lens 6 so that the focus error signal is 0, the focus position of the objective lens 6 and the position of the information recording surface of the optical disk 7 can be made to coincide with each other.

In the above-described conventional structure, however, when recording and reproduction of CD optical disks are performed, the position where the focus error signal is 0 and the position where the jitter (the value of time-axis variation) of the information signal is minimum do not always coincide with each other.

Hereinafter, this problem will be described with reference to the drawings.

FIGS. 12(a) and 12(b) are schematic views of convergence conditions of the objective lens.

FIG. 12(a) shows a manner of convergence on a DVD optical disk. Reference numeral 23 represents a DVD optical disk substrate. Reference numeral 24 represents the information recording surface. In DVD optical disks, the distance from the substrate surface to the information recording surface is 0.6 mm. Reference numeral 25 represents beams of the converged light.

FIG. 12(b) shows a manner of convergence on a CD optical disk. Reference numeral 26 represents a CD optical disk substrate. Reference numeral 27 represents the information recording surface. In CD optical disks, the distance from the substrate surface to the information recording surface is 1.2 mm. Reference numeral 28 represents beams of the converged light.

As shown in FIG. 12(*a*), in the case of DVD optical disks, the beams 25 of the converged light are incident on the DVD optical disk substrate 23 and are converged on the information recording surface 24 without any aberration.

However, when light is converged on a CD optical disk by the same objective lens, since the distance from the substrate surface to the information recording surface is different from that in the case of DVD optical disks, spherical aberration is generated, so that as shown in FIG. 12(*b*), the farther a beam is from the optical axis, the farther the position of convergence of the beam is from the objective lens. Consequently, the beams 28 of the converged light cannot be converged to one point.

As a result of an optical analysis, the inventors have found that in the above-described case, the jitter of the information signal is minimum when the information recording surface is situated substantially at the position of the average focal length, that is, when the wavefront aberration of the converged light beam spot on the information recording surface is substantially minimum. With respect to the sizes of the detection areas 18 and 21 of the photodetector 10 used for the conventional focus error signal detection by the above-described SSD method, the widths thereof are the same, and further, are set so as to be larger than the minimum diameter that the diffracted light beam spots 15 and 16 can have as shown in FIGS. 11(*a*) to 11(*c*). These are set on the precondition that the density of the reflected light is uniform like in the case of DVD optical disks.

Therefore, under such a condition, in the case of DVD optical disks, the focus error signal is 0 when the spot size (see FIG. 9(*b*)) of the light converged by the objective lens 6 is minimum on the information recording surface, and the jitter is also minimum at this time. However, in the case of CD optical disks, since the density of the reflected light is nonuniform because of spherical aberration, the jitter of the information signal is not minimum at the position where the focus error signal is 0. That is, the focus error signal is 0 at a position different from the position of the average focal length.

That is, in the conventional optical head device, when a DVD optical disk is used, since the light converged by the objective lens is converged to one point, the position where the jitter of the information signal is minimum can be detected irrespective of the sizes of the detection areas of the photodetector 10. However, when a CD optical disk is used, since the position where the focus error signal by the SSD method is 0 and the position where the jitter of the information signal is minimum are different because of spherical aberration, the time-axis variation of the information signal cannot be reduced.

Moreover, in the above-described conventional structure, in the case of recording and reproduction of DVD optical disks, when the base material thickness of a DVD varies, the difference (focus offset) between the position where the jitter (the value of time-axis variation) of the information signal is minimum and the position where the focus signal is 0 varies.

That is, when the base material thickness of a DVD varies, a large difference in spherical aberration variation is caused between the light beam using all the NAs to obtain a DVD reproduction signal and the light beam being incident on the photodetector for focus detection where the NA is limited to obtain a CD reproduction signal, so that the focus offset significantly varies.

SUMMARY OF THE INVENTION

In view of the above-described problem of the conventional optical head device, an object of the present invention is to make the time-axis variation of the information signal smaller than that of the conventional device irrespective of the type of the information medium and reduce the focus offset variation when the base material thickness of a high-density recording medium varies.

The 1st invention of the present invention is an optical head device comprising:

a diffraction element diffracting a light beam reflected from an information medium and being divided into a plurality of areas in a direction of a radius of a luminous flux of the light beam;

a converging optical system converging the diffracted light beam; and a photodetector having a plurality of photodetection areas and detecting the converged diffracted light beam, wherein (1) of a plurality of areas of said photodetector, a width of a photodetection area where a diffracted light beam from an area, close to a center of an optical axis of the light beam, of said diffraction element divided into a plurality of areas in the direction of the radius of the luminous flux of the light beam is detected is smaller than a minimum spot diameter of the diffracted light beam on said photodetector, and (2) of a plurality of areas of said photodetector, a width of a photodetection area where a diffracted light beam from an area, far from the center of the optical axis of the light beam, of said diffraction element divided into a plurality of areas is detected is equal to or larger than the minimum spot diameter of the diffracted light beam on said photodetector.

The 2nd invention of the present invention is an optical head device comprising:

a diffraction element diffracting a light beam reflected from an information medium and being divided into a plurality of areas in a direction of a radius of a luminous flux of the light beam;

means for dividing the diffracted light beam;

a converging optical system converging the divided diffracted light beam; and a photodetector having a plurality of photodetection areas and detecting the converged diffracted light beam, wherein (1) a distance between a first position, in a plurality of photodetection areas, on which a principal ray of a divided diffracted light beam from an area, close to a center of an optical axis of the light beam, of a plurality of areas of said diffraction element is incident and a position of a boundary line between the photodetection area on which the divided principal ray is incident and another photodetection area adjoining the area is smaller than a radius of a minimum spot of a diffracted light beam that could be formed on said photodetector if the divided diffracted light beam were not divided, and (2) a distance between a second position, in a plurality of photodetection areas, on which a principal ray of a divided diffracted light beam from an area, far from the center of the optical axis of the light beam, of a plurality of areas of said diffraction element is incident and a position of a boundary line between the photodetection area on which the divided principal ray is incident and another photodetection area adjoining the area is equal to or larger than the radius of the minimum spot of the diffracted light beam that could be formed on said photodetector if the divided diffracted light beam were not divided.

The 3rd invention of the present invention is an optical head device according to said the 1st or 2nd invention, wherein said diffraction element is a hologram element having polarization anisotropy.

The 4th invention of the present invention is an optical head device according to any one of said the 1st to 3rd inventions, wherein means for detecting a focus error signal from the diffracted light beam is provided.

The 5th invention of the present invention is an optical head device according to any one of said the 1st to 4th inventions, wherein a position of convergence of a first diffracted light beam generated from some areas of said diffraction element and a position of convergence of a second diffracted light beam generated from other areas of said diffraction element are different, and means is provided for detecting a focus error signal based on a difference between a light quantity distribution of a spot of the first diffracted light beam on said photodetector and a light quantity distribution of a spot of the second diffracted light.

The 6th invention of the present invention is an optical head device according to said the 4th or 5th inventions, wherein said diffraction element is divided in a direction of a radius into at least three areas of a first area, a second area and a third area being close to the optical axis, far from the optical axis and intermediate therebetween, respectively, and a diffracted light beam from the third area representing the intermediate area is not used for focus error signal detection.

The 7th invention of the present invention is an optical head device according to said the 6th invention, wherein an inside diameter of the third area of said diffraction element is in a range of 0.5 to 0.75 of an effective diameter of the light beam reflected from the information recording medium, and an outside diameter of the third area is in a range of 0.75 to 1 of the effective diameter of the light beam reflected from the information recording medium.

The 8th invention of the present invention is an optical head device according to said the 7th invention, wherein the outside diameter of the third area of said diffraction element differs between in a direction vertical to a direction of division of said photodetector and in a direction parallel thereto.

The 9th invention of the present invention is an optical head device according to said the 8th invention, wherein the outside diameter of the third area of said diffraction element is the same as an inside diameter of the second area in the direction vertical to the direction of division of said photodetector.

The 10th invention of the present invention is an optical head device according to any one of said the 6th to 9th inventions, wherein a semicircular area is provided in an area of said diffraction element which area is far from the optical axis of the reflected beam in a direction vertical to a direction of division of said photodetector, and a diffracted light beam from the area is not used for the focus error signal detection.

DESCRIPTION OF THE REFERENCE NUMERALS

Figure 1:
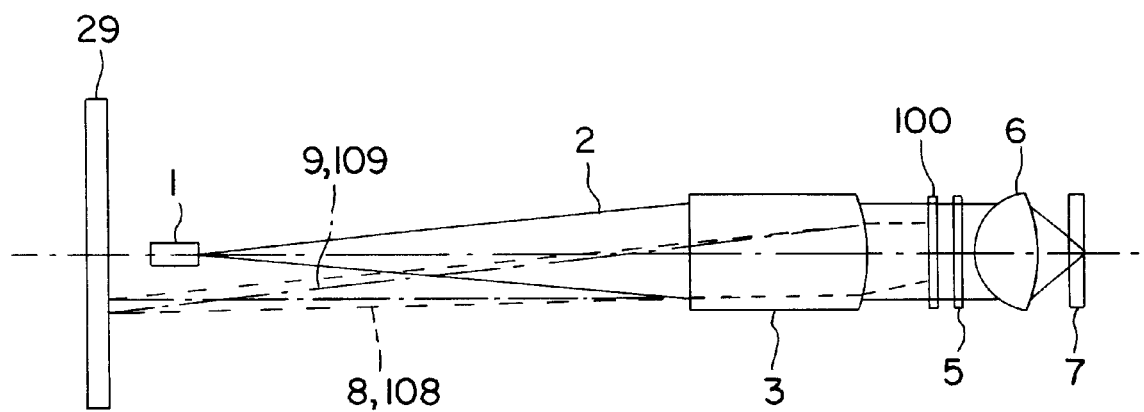
FIG. 1 is a view showing the structure of an optical system of an optical head device according to a first embodiment of the present invention.
Figure 1:
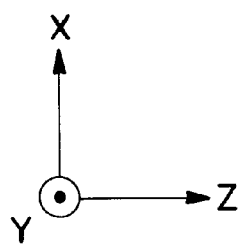

1 Semiconductor laser
2 Light beam

3 Collimator lens
5 Quarter-wave plate
6 Objective lens
7 Optical disk
10, 29, 39 Photodetectors
40, 42 Diffracted light beams
4, 38, 100 Polarization anisotropic holograms

DESCRIPTION OF THE PREFERRED EMBODIMENTS

Hereinafter, embodiments of the present invention will be described with reference to the drawings.

(First Embodiment)

FIG. 1 is a view showing the structure of an optical system of an optical head device according to a first embodiment of the present invention.

The structure shown in the figure is the same as the structure of the optical head device shown in the conventional example except the points mentioned below. Therefore, the same elements as those of FIG. 8 are denoted by the same reference numerals and descriptions thereof are omitted.

Figure 8:
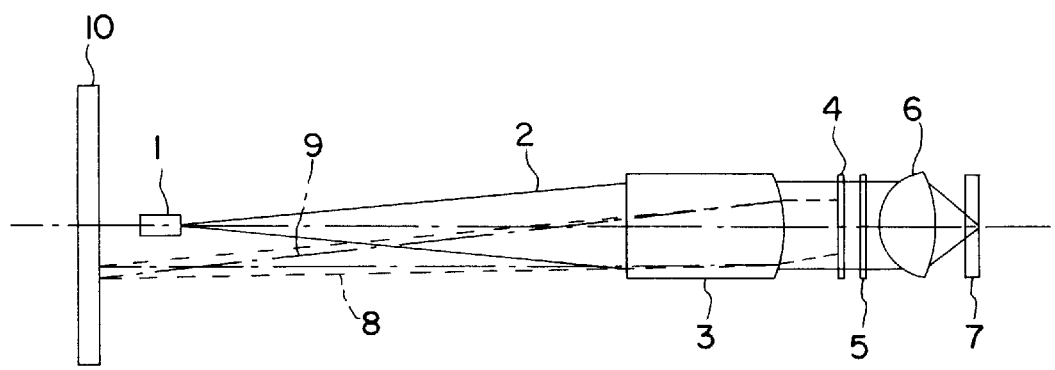
FIG. 8 is a view showing the structure of the optical system of the conventional optical head device.
Figure 8:
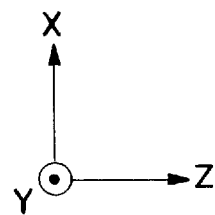
Figure 9A:
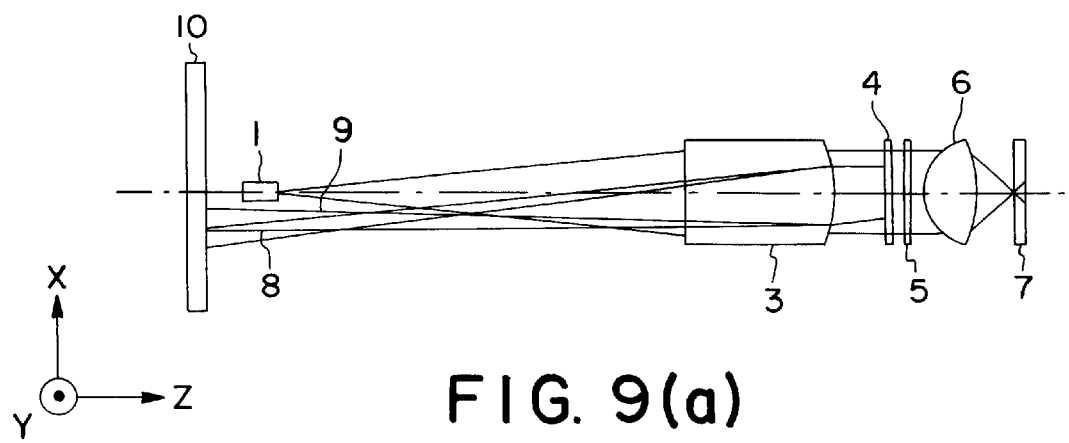
FIGS. 9(a) to 9(c) are views of assistance in explaining the focus error signal detecting method.
Figure 9B:
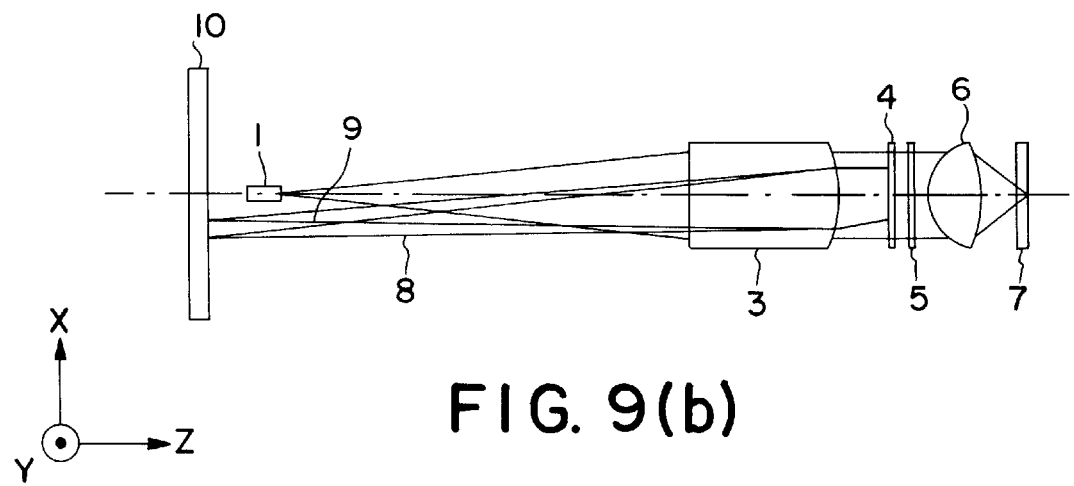
Figure 9C:
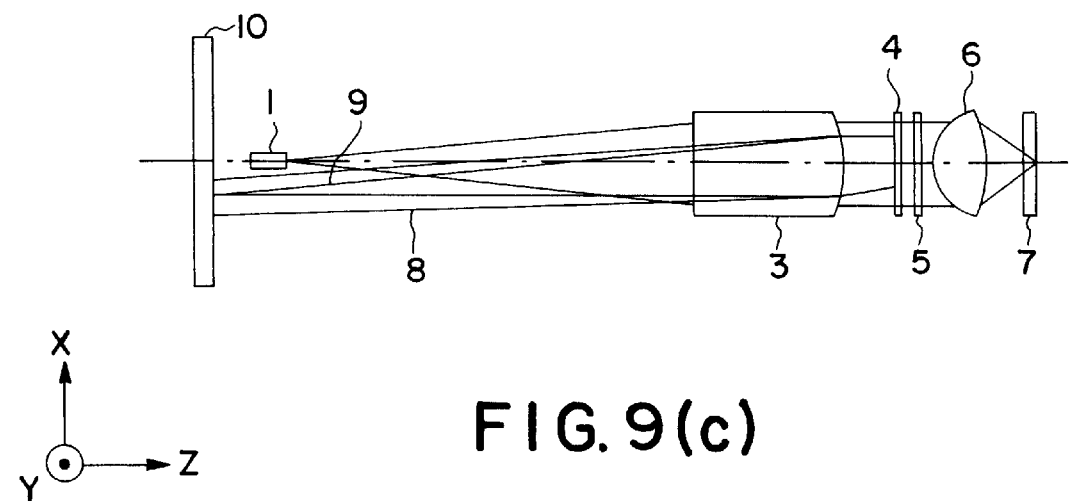
Figure 10A:
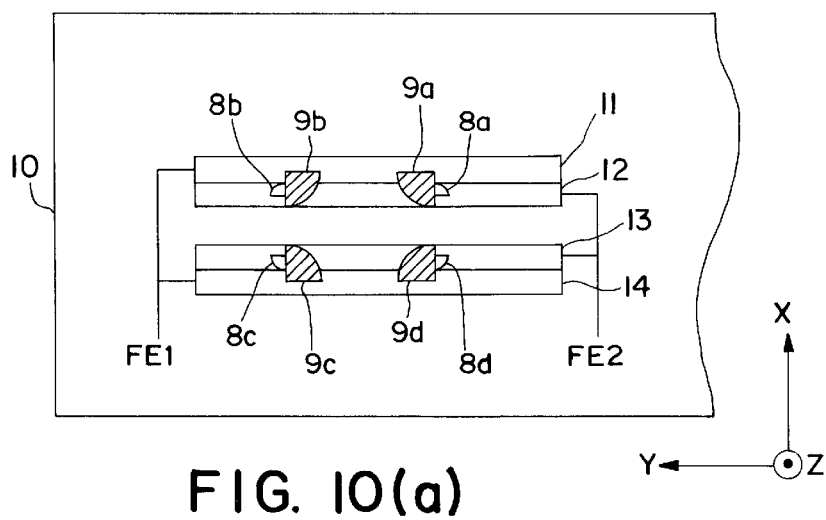
FIGS. 10(a) to 10(c) are views showing the photodetection areas of the conventional photodetector and the diffracted light beam spots on the photodetector.
Figure 10B:
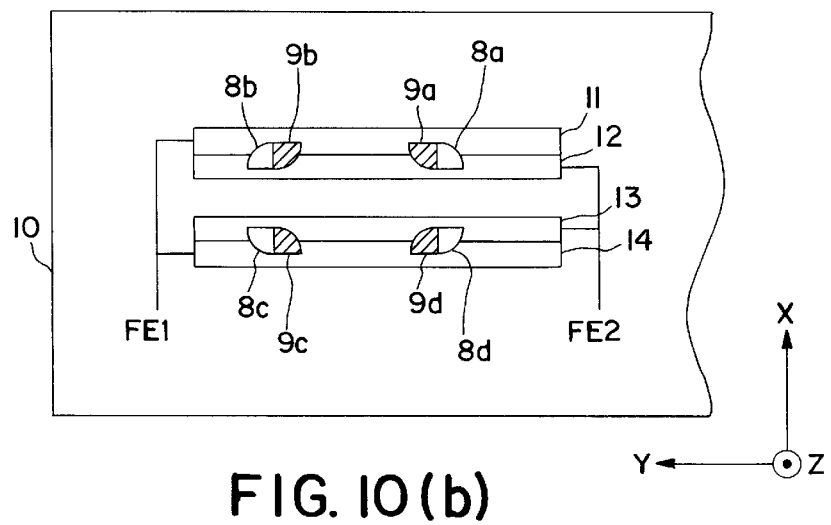
Figure 10C:
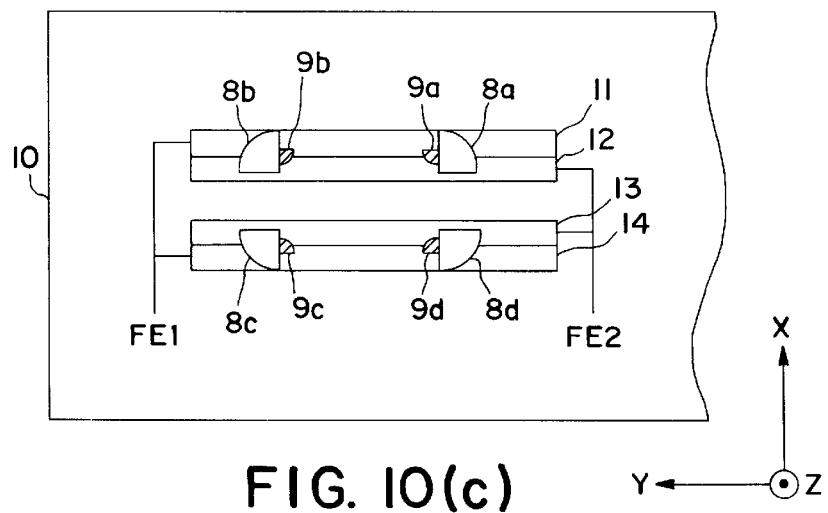
Figure 11A:
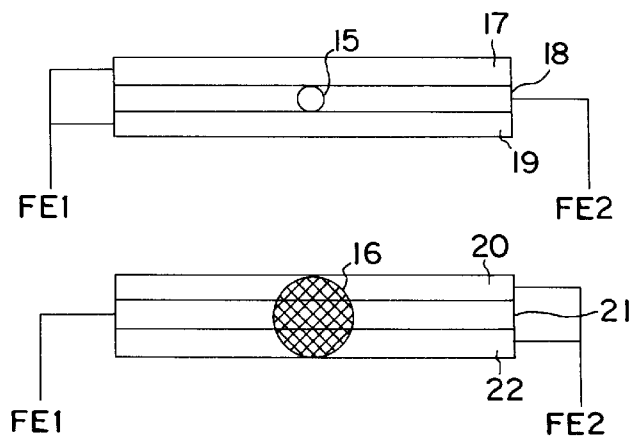
FIGS. 11(a) to 11(c) are views showing the diffracted light beam spots being virtually joined, and correspond to FIGS. 10(a) to 10(c), respectively.
Figure 11B:
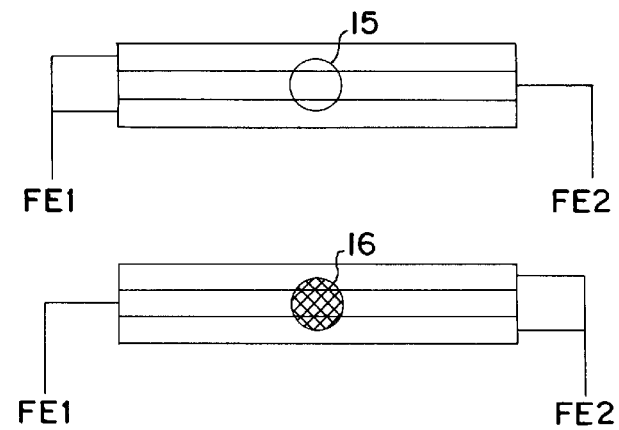
Figure 11C:
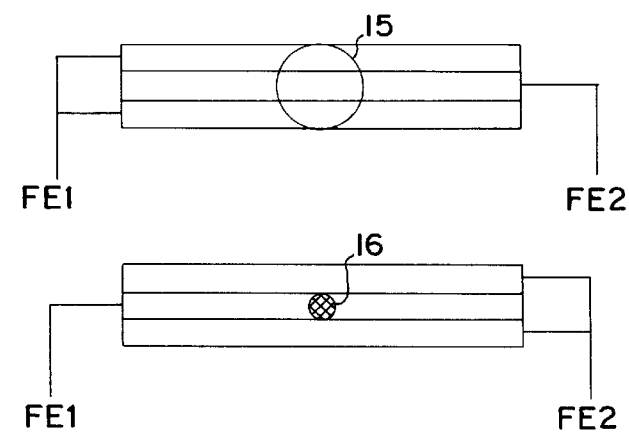
Figure 12A:
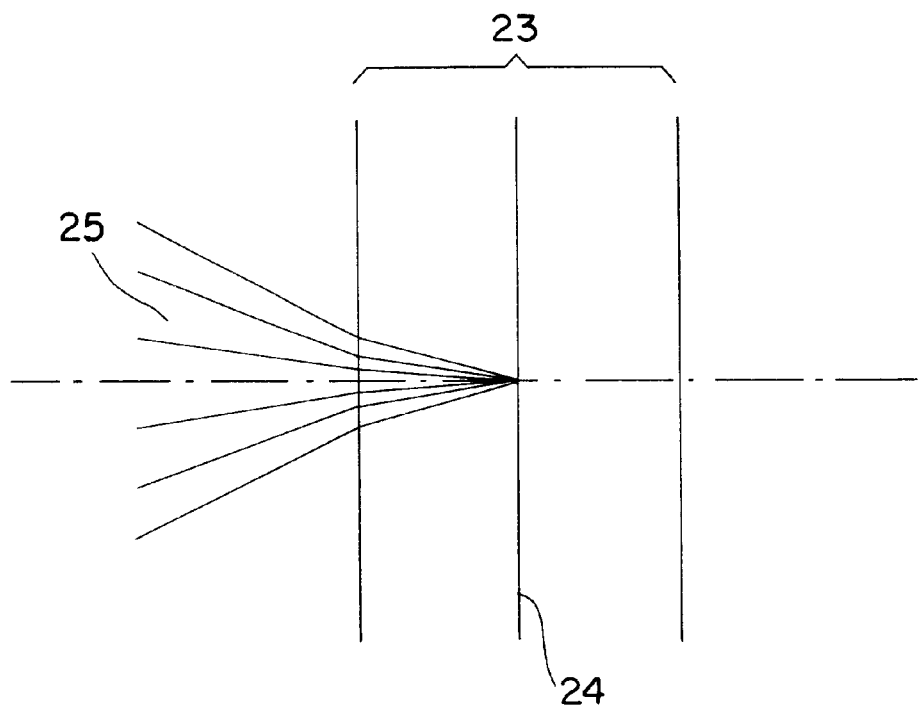
FIGS. 12(a) and 12(b) are schematic views of the convergence conditions of the objective lens.
Figure 12B:
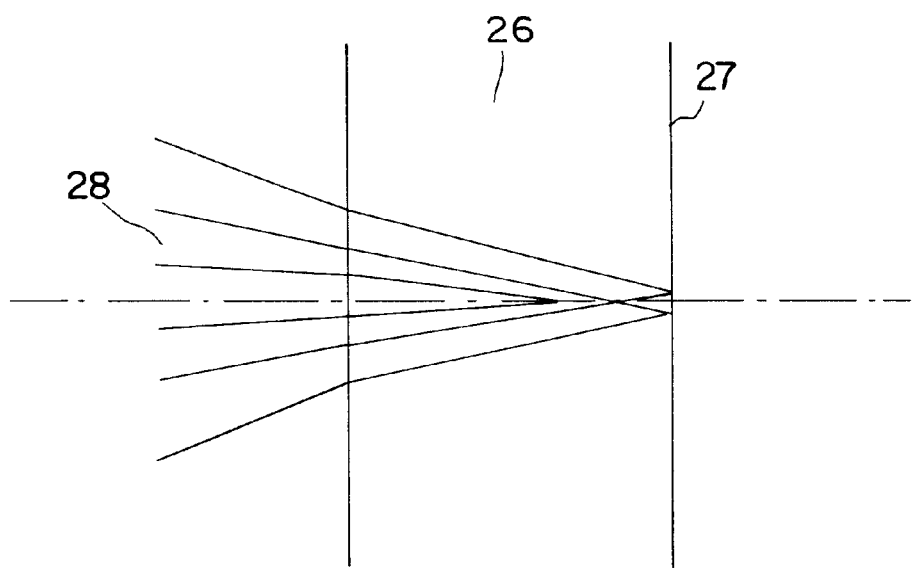

This structure is different from the structure of FIG. 8 in a photodetector 29 and a polarization anisotropic hologram 100. The photodetector 29 is different from the photodetector 10 of FIG. 8 in the pattern sizes of the photodetection areas. Moreover, the hologram pattern of the polarization anisotropic hologram 100 is different from that of the polarization anisotropic hologram 4 of FIG. 8.

The wavelength of the semiconductor laser 1 is 0.65 µm. The light beam 2 emitted from the semiconductor laser 1 is a linearly polarized light beam having its plane of polarization within the x-z plane of the x, y and z coordinates shown in the lower left part of the figure. After converted into a parallel light beam by the collimator lens 3, the light beam 2 is incident on the polarization anisotropic hologram 100.

To form the polarization anisotropic hologram 100, for example, with lithium niobate as the substrate, part of the lithium is replaced with protons. The polarization anisotropic hologram 100 is disposed so as to transmit a polarized light beam having its plane of polarization within the x-z plane and diffract a polarized light beam having its plane of polarization within the y-z plane. The light beam 2 is transmitted by the polarization anisotropic hologram 100 as it is and is then converted into a circularly polarized light beam by the quarter-wave plate 5.

The circularly polarized light beam is converged by the objective lens 6 to form a minute spot on the information recording surface of the optical disk 7.

The NA of the objective lens is 0.6. When the optical disk 7 is a CD, aberration is generated as mentioned as the problem to be solved by the invention.

The circularly polarized light reflected at the information recording surface of the optical disk 7 passes through the objective lens 6 and the quarter-wave plate 5 to be converted into a linearly polarized light beam having its plane of polarization within the y-z plane, and is diffracted by the polarization anisotropic hologram 100.

The polarization anisotropic hologram 100 is formed so that the direction of diffraction is different between the area of the central part through which light, of within approximately 0.38 in terms of the NA of the objective lens 6, of the reflected light beam passes, and the area of the peripheral part. The light from the area of the central part becomes the diffracted light beams 9 and 8 and the light from the peripheral part becomes diffracted light beams 109 and 108. These light beams are converged by the collimator lens 3.

At this time, the position of convergence is different between the diffracted light beam 9 and the diffracted light beam 8 and between the diffracted light beam 109 and the diffracted light beam 108. The diffracted light beam 9 is converged at position closer to the collimator lens 3 than the diffracted light beam 8 and the diffracted light beam 109 is converged at position closer to the collimator lens 3 than the diffracted light beam 108. The diffracted light beams 9, 8, 108 and 109 are incident on the photodetector 29 to be detected. By computing the output of the photodetector 29, the focus error signal is obtained.

In the case of DVD optical disks, the information signal is obtained from all the diffracted light beams diffracted at the area of the central part and the area of the peripheral part of the polarization anisotropic hologram 100.

On the contrary, in the case of CDs, since the spherical aberration of the objective lens is extremely large, most of the diffracted light beams 109 and 108 from the peripheral part of the polarization anisotropic hologram 100 are not incident on the photodetector 29, so that the information signal is obtained only from the diffracted light beams 9 and 8 diffracted substantially at the central part.

As described above, in the case of CDs, by using, of the light reflected from the information recording surface, only a light beam, with little aberration, of within approximately 0.38 in terms of the NA of the objective lens 6 for detection of the information signal, excellent signal detection is enabled.

Figure 2A:
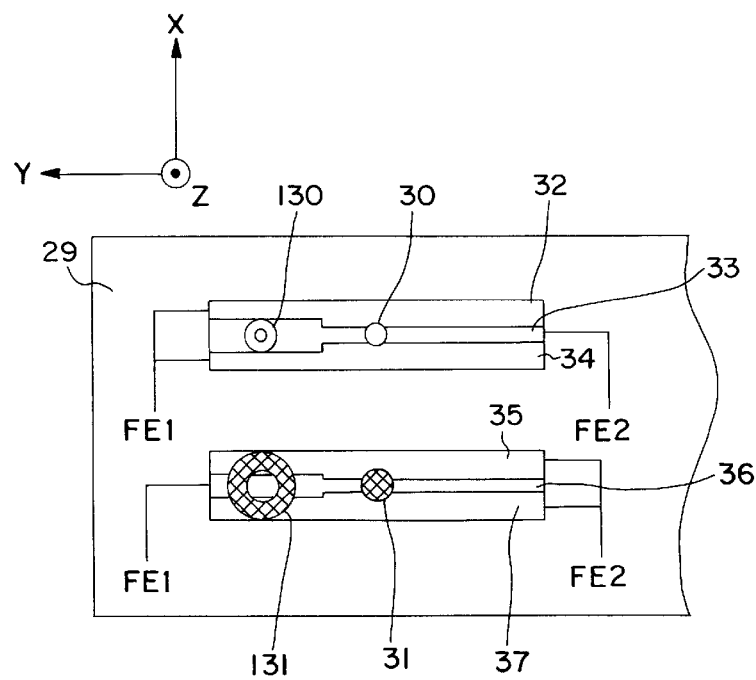
FIG. 2(a) is a view showing an example of a pattern of a photodetection area of a photodetector in the first embodiment, and diffracted light beam spots when the optical disk is a DVD.
Figure 2B:
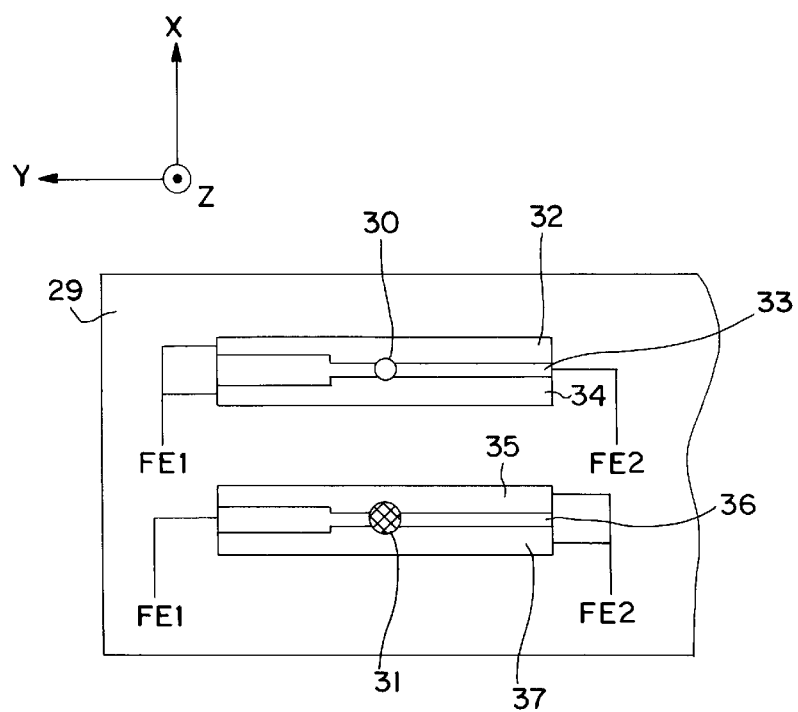
FIG. 2(b) is a view showing an example of a pattern of a photodetection area of a photodetector in the first embodiment, and diffracted light beam spots when the optical disk is a CD.

FIG. 2(a) shows an example of the pattern of the photodetection area of the photodetector 29 and diffracted light beam spots when the optical disk 7 is a DVD. FIG. 2(b) shows an example of the pattern of the photodetection area of the photodetector 29 and diffracted light beam spots when the optical disk 7 is a CD.

FIGS. 2(a) and 2(b) show a case where the distance between the objective lens 6 and the optical disk 7 is larger than the average focal length of the objective lens 6. Reference numerals 30, 31, 130 and 131 represent diffracted light beam spots which are formed by the diffracted light beams 9, 8, 109 and 108 shown in FIG. 1 being converged on the photodetector 29, respectively.

Reference numerals 32 to 37 represent detection areas. The focus error signal is obtained by the difference between the output FE1 of the detection areas 32, 34 and 36 and the output FE2 of the detection areas 33, 35 and 37 (FE1−FE2).

When the optical disk 7 in FIG. 1 is a CD, since the light converged by the objective lens 6 includes spherical aberration, the position of convergence of a light beam close to the optical axis and the position of convergence of a light beam far from the optical axis are different. The amount of spherical aberration is generally expressed as the amount of shift (longitudinal aberration) of the positions of the imaging points (paraxial image points) of the light beams other than a paraxial light beam (light beam close to the optical axis) from the position of the imaging point of the paraxial light beam.

The generation amount of the longitudinal aberration increases as the height, from the optical axis, of the light beam passing through the objective lens 6 increases. This is because the radius of curvature of the lens surface increases.

Therefore, the average focus position mentioned in the description of the problem of the conventional device is not at the midpoint between the position of the paraxial image point and the position where the light beam being farthest from the optical axis is imaged, but is to the side of the paraxial image point.

The diffracted light beams 109 and 108 from the peripheral part of the polarization anisotropic hologram 100 do not contribute to the focus signal in the case of reproduction of CDs since they are hardly incident on the photodetector 29 because of the spherical aberration.

Figure 3:
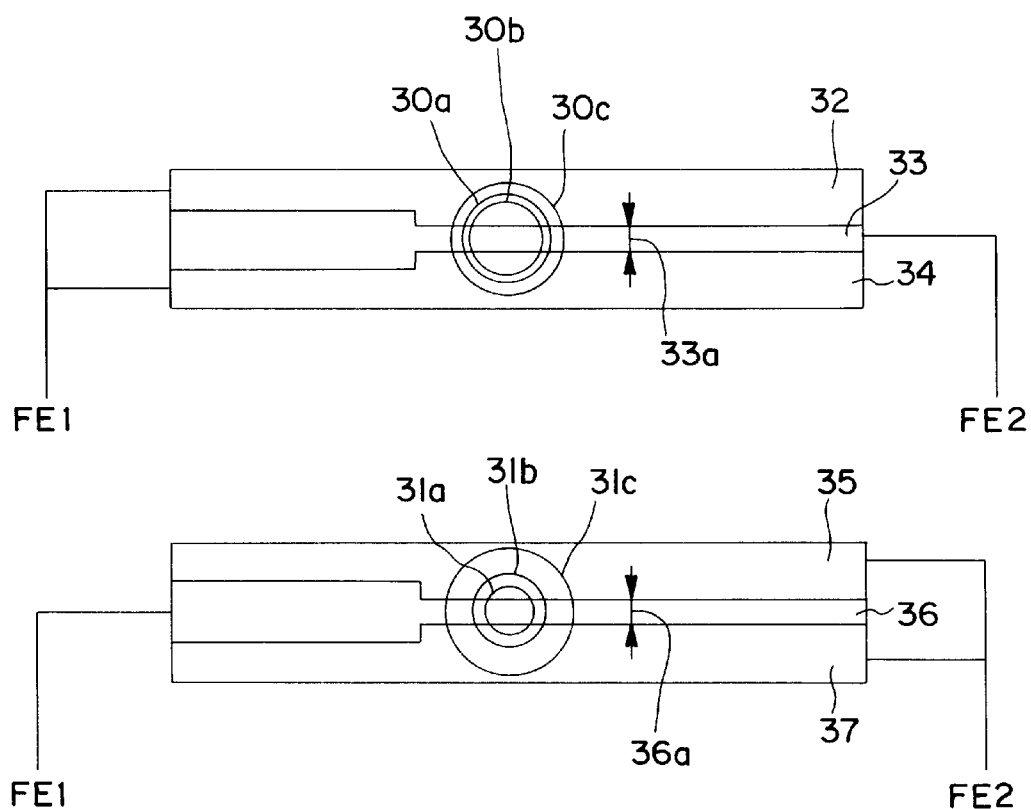
FIG. 3 is a detailed view of diffracted light beam spots on the photodetector in the embodiment.

Next, FIG. 3 shows detailed views of the spots of the first diffracted light beam 9 and the second diffracted light beam 8 at the photodetector 29 when a CD is reproduced.

FIG. 3 shows a case where the optical disk 7 is a CD, and the information recording surface thereof is situated at the average focus position of the objective lens 6. Reference numerals 30a to 30c and 31a to 31c represent spots formed by specific light beams.

The spots of the light beams from the peripheral area of the polarization hologram 100 are not shown in FIG. 3 because the spherical aberration generated when a CD is reproduced is large and most of the light beams are therefore not incident on the detector 29 as mentioned above.

The spot 30b and the spot 31b are formed on the photodetector 29 by, of the luminous flux converged by the objective lens 6, light beams converged to one point on the information recording surface being reflected and diffracted, and have the same size.

The spot 30a and the spot 31a are formed on the photodetector 29 by light beams closer to the optical axis than the above-mentioned light beams converged to one point on the information recording surface being reflected and diffracted. The spot 30a is larger than the spot 30b. The spot 31a is smaller than the spot 31b.

Since the average focus position is to the side of the paraxial image point as mentioned above, the size of the spots 30a and 31a is not very different from that of the spots 30b and 31b.

The spots 30c and 31c are formed on the photodetector 29 by the light beams farther from the optical axis than the above-mentioned light beams converged to one point on the information recording surface being reflected and diffracted. Since the light beams are converged to a position far from the average focus position compared to the paraxial image point, the spot 30c and the spot 31c are both larger than the spots 30b and 31b, and the spot 31c is larger than the spot 30c.

Therefore, the density of the light intensity distribution (light quantity distribution) of the spots 30a to 30c is higher in the peripheral part than in the central part, whereas the light intensity distribution density of the spots 31a to 31c is higher in the central part than in the peripheral part.

Consequently, the output of the photodetection area 33 is smaller than the output of the photodetection area 36.

On the other hand, since the outputs of the photodetection areas 32 and 34 are smaller than the outputs of the photodetection areas 35 and 37, FE1–FE2 can be made zero by appropriately selecting the minimum sizes (the lengths in the direction of the x-axis in FIG. 3) of the photodetection areas 33 and 36 in a range smaller than the diameter of the minimum spot. The widths of the photodetection areas smaller than the minimum spot diameter of the diffracted light beams on the photodetector in the present invention correspond to the lengths 33a and 36a, in the direction of the x-axis, of the photodetection areas 33 and 36 in FIG. 3.

According to an experiment by the inventors of this application, by making 20 μm the minimum size of the spots 30a to 30c and the spots 31a to 31c of the detection areas 33 and 36 and making 50 μm the minimum size of the spots 130a to 130c and the spots 131a to 131c when the minimum spot diameter of the diffracted light beams 9 and 8 on the surface of the photodetector 29 was substantially 40 μm, the jitter of the information signal could be minimized when the focus error signal was 0 both in the cases where the optical disk 7 was a CD and where the optical disk 7 was a DVD.

Moreover, the focus offset variation when the base material thickness varies by 40 μm could be reduced to 0.2 μm or smaller in the case where the optical disk 7 was a DVD. Thus, a sufficiently acceptable level as a system could be achieved.

(Second Embodiment)

Next, an optical head device according to a second embodiment of the present invention will be described.

Figure 4:
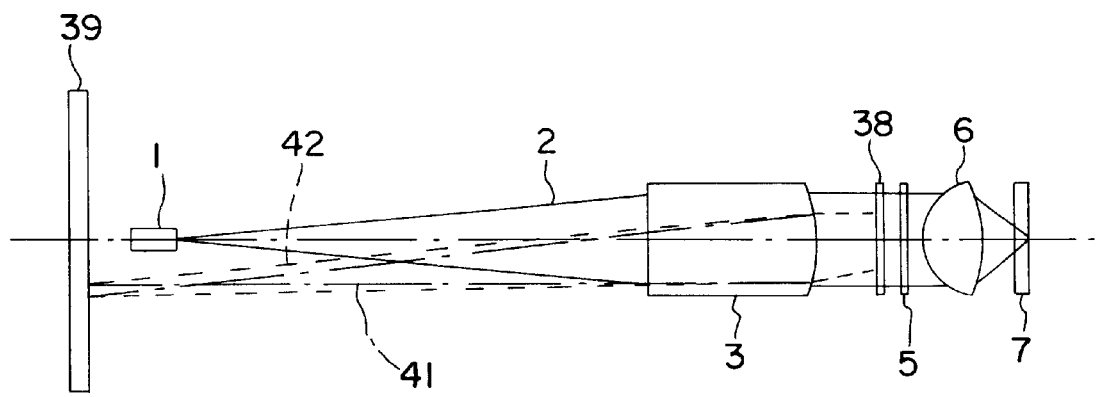
FIG. 4 is a view showing the structure of an optical head device according to a second embodiment of the present invention.
Figure 4:
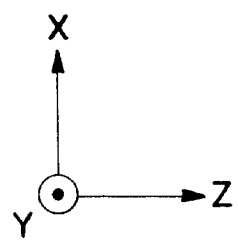

FIG. 4 is a view showing the structure of the optical head device according to the second embodiment. In the figure, the same elements as those of FIG. 1 are denoted by the same reference numerals and descriptions thereof are omitted.

This device is different from the optical head device of the first embodiment in a polarization anisotropic hologram 38 and a photodetector 39.

Hereinafter, the polarization anisotropic hologram 38 and the photodetector 39 will be detailed.

Figure 5:
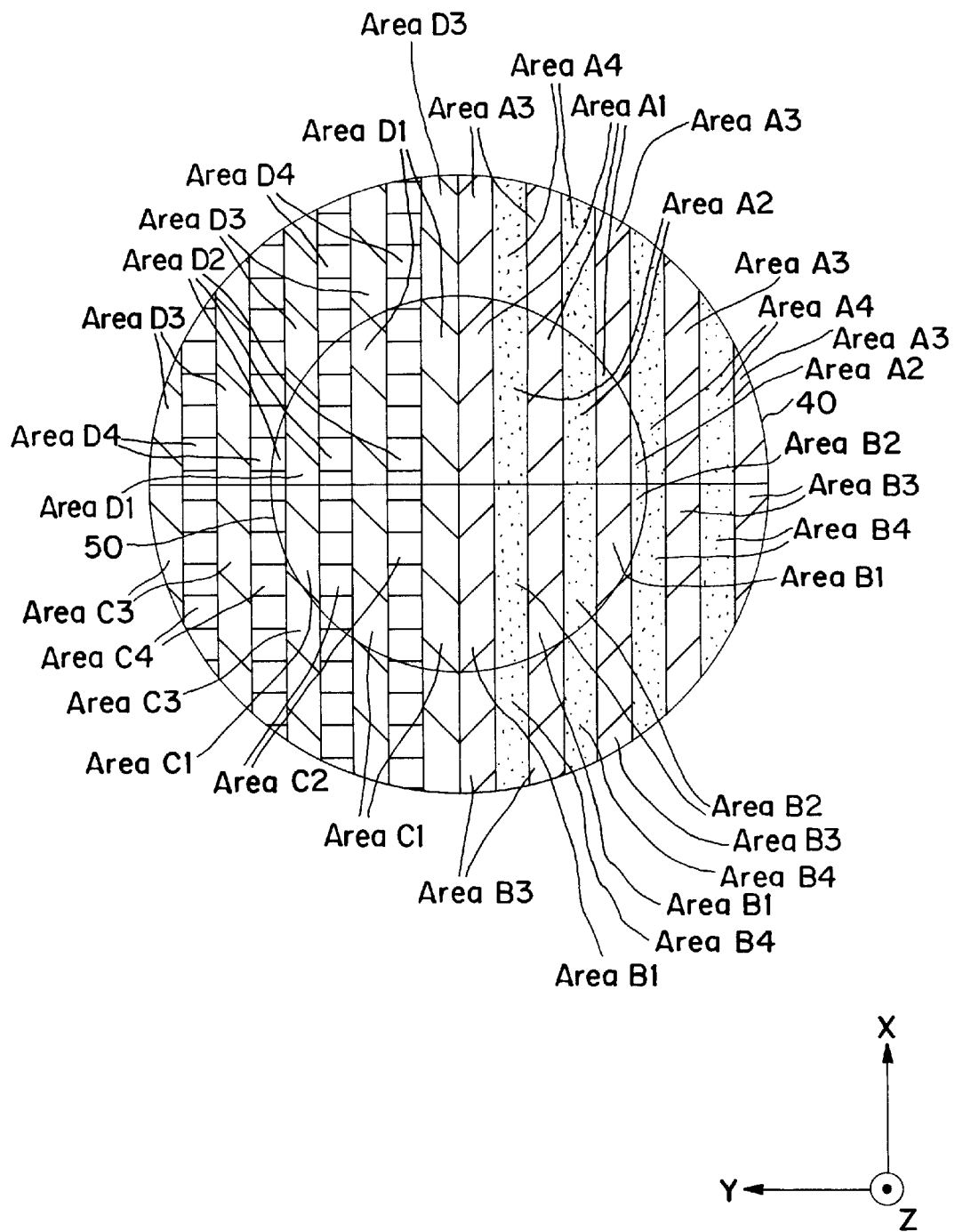
FIG. 5 is a view showing a hologram pattern of a polarization anisotropic hologram in the embodiment.

FIG. 5 is a view showing the hologram pattern of the polarization anisotropic hologram 38.

In FIG. 5, reference numeral 40 represents the hologram pattern. The hologram pattern 40 was formed by proton-replacing a lithium niobate substrate like that described in the first embodiment.

The hologram pattern 40 can be regarded as being divided into quadrant groups as shown as groups of areas A1 to A4, areas B1 to B4, areas C1 to C4 and areas D1 to D4 in the figure. Further, the hologram pattern 40 has its areas divided between the inside and the outside of the circular boundary line 501. While in FIG. 5, the inside areas and the outside areas are provided with the same patterns in order to avoid complication of display of the figure, in actuality, they are different areas as mentioned above.

Description will be further given with the areas A1 to A4 in a quadrant as an example. As shown in the figure, the area A1 and the area A2 are beltlike areas inside the boundary line 501, and are alternately disposed. The area A3 and the area A4 are beltlike areas outside the boundary line 501, and are alternately disposed. The areas in the other quadrants are disposed similarly to the above-mentioned areas.

The size and disposition of the hologram pattern was decided so that light beams in a range of 0.38 to 0.6 in terms of the NA of the objective lens 6 pass through the areas A3, A4, B3, B4, C3, C4, D3 and D4 and light beams of within 0.38 in terms of the NA of the objective lens 6 pass through the areas A1, A2, B1, B2, C1, C2, D1 and D2.

The hologram pattern is designed so that two diffracted light beams having their focal points on the front and the rear sides of the photodetector 39, respectively, are diffracted from the areas A1 and A3 and the areas A2 and A4 as + first-order diffracted light beams. The front side of the photodetector 39 is, with respect to the position of the photodetector 39, the side where the optical disk 7 is set. The rear side of the photodetector 39 is the side opposite thereto.

This applies to the areas B1, B2, B3, B4, C1, C2, C3, C4, D1, D2, D3 and D4. These areas A1, A2 to D3 and D4 are divided into the four groups A to D on the hologram pattern and each group has a quadrant shape, whereby a polarization anisotropy as described below can be realized.

Figure 6A:
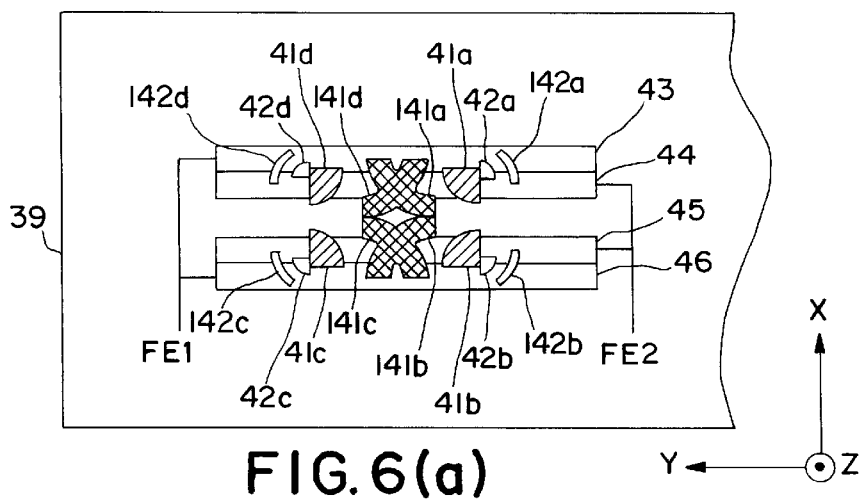
FIG. 6(a) is a view showing the photodetection areas of the photodetector and the diffracted light beam spots when the position of the information recording surface of the optical disk is on the side of the focus position of the objective lens which side is farther from the objective lens in the second embodiment.

That is, the images of the diffracted light beams having passed through the quartered hologram pattern are formed being divided into quadrants on the photodetector 39 (see FIG. 6(a)).

Moreover, the hologram pattern is designed so that four diffracted light beams having their focal points on the surface of the photodetector 39 are diffracted from the areas A3, B3, C3 and D3 as + first-order diffracted light beams.

In FIG. 4, the light beam reflected from the optical disk 7 is converted into a linearly polarized light beam having its plane of polarization within the Y-Z plane by passing through the quarter-wave plate 5, and is incident on the polarization anisotropic hologram 38. From the polarization anisotropic hologram 38, a plurality of diffracted light beams are generated as described above. These diffracted light beams are converged by the collimator lens 3.

In FIG. 4, for simplicity, the diffracted light beams generated from the areas A1, B1, C1, D1, A3, B3, C3 and D3 of the polarization anisotropic hologram 38 and having their focal points on the front side of the photodetector 39 are collectively denoted as a diffracted light beam 41, and the diffracted light beams generated from the areas A2, B2, C2, D2, A4, B4, C4 and D4 and having their focal points on the rear side of the photodetector 39 are collectively denoted by a diffracted light beam 42.

Figure 6B:
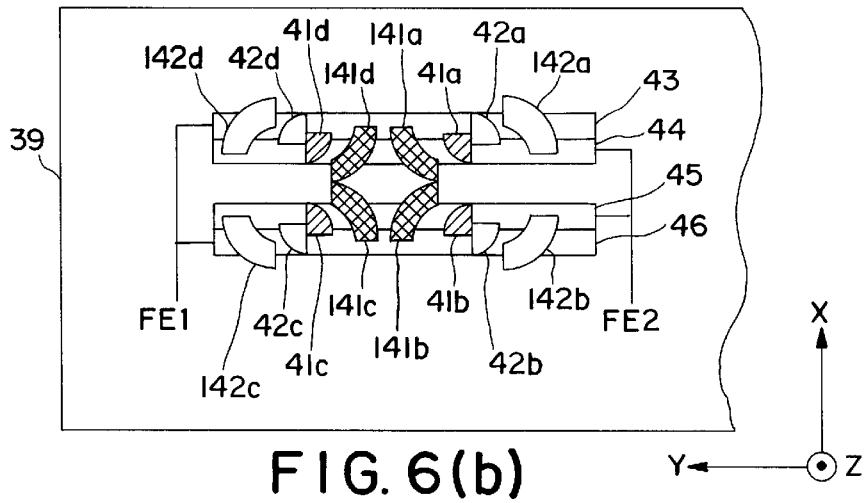
FIG. 6(b) is a view showing the photodetection areas of the photodetector and the diffracted light beam spots when the position of the information recording surface of the optical disk substantially coincides with the average focus position of the objective lens in the second embodiment.
Figure 6C:
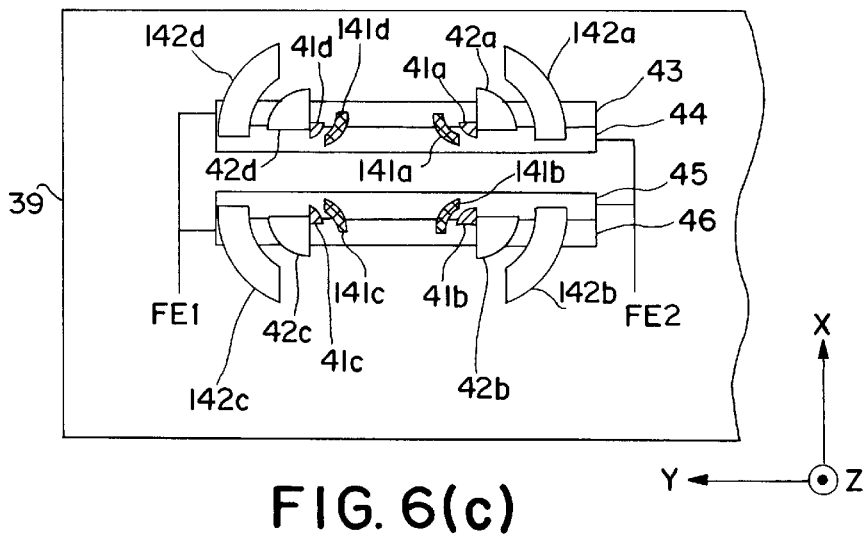
FIG. 6(c) is a view showing the photodetection areas of the photodetector and the diffracted light beam spots when the position of the information recording surface of the optical disk is on the side of the focus position of the objective lens which side is closer to the objective lens in the second embodiment.

FIGS. 6(a) to 6(c) show the photodetection areas of the photodetector 39 and the diffracted light beam spots.

In the figures, reference numerals 43 to 46 represent photodetection areas. Reference numerals 41a to 41d and 141a to 141d represent diffracted light beam spots formed by the diffracted light beams generated from the areas A1, B1, C1, D1, A3, B3, C3 and D3 of the polarization anisotropic hologram 38. Reference numerals 42a to 42d and 142a to 142d represent spots of the diffracted light beams generated from the areas A2, B2, C2, D2, A4, B4, C4 and D4 of the polarization anisotropic hologram 38.

The sum of the outputs of the photodetection area 43 and the photodetection area 46 is represented by FE 1, and the sum of the outputs of the photodetection area 44 and the photodetection area 45 is represented by FE2.

The diffracted light beams 41 and 42 of FIG. 4 correspond to the divisional diffracted light beam spots 41a to 41d and 141a to 141d, and 42a to 42d and 142a to 142d shown in FIGS. 6(a) to 6(c).

FIG. 6(a) shows a case where the position of the information recording surface of the optical disk 7 is on the side of the focus position of the objective lens 6 which side is farther from the objective lens 6. FIG. 6(b) shows a case where the position of the information recording surface of the optical disk 7 substantially coincides with the average focus position of the objective lens 6. FIG. 6(c) shows a case where the position of the information recording surface of the optical disk 7 is on the side of the focus position of the objective lens 6 which side is closer to the objective lens 6.

The polarization anisotropic hologram is designed so that the centers of the quadrants formed by the diffracted light beam spots 41a to 41d and 42a to 42d, that is, the positions where the principal rays of the diffracted light beams are incident on the photodetector 39 are 10 μm away from the boundary line between the photodetection areas 43 and 44 and the boundary line between the photodetection areas 45 and 46 in FIGS. 6(a) to 6(c).

Here, the first position in a plurality of photodetection areas of the present invention corresponds to the central positions of the quadrants formed by the diffracted light beam spots 41a to 41d and 42a to 42d. The positions of the boundary lines of the present invention correspond to the boundary line between the photodetection areas 43 and 44 and the boundary line between the photodetection areas 45 and 46.

Moreover, the polarization anisotropic hologram is designed so that the centers of the quadrants formed by the diffracted light beam spots 141a to 141d and 142a to 142d, that is, the positions where the principal rays of the diffracted light beams are incident on the photodetector 39 are 25 μm away from the boundary line between the photodetection areas 43 and 44 and the boundary line between the photodetection areas 45 and 46.

Here, the second position in a plurality of photodetection areas of the present invention corresponds to the central positions of the quadrants formed by the diffracted light beam spots 141a to 141d and 142a to 142d. The positions of the boundary lines of the present invention correspond to the boundary line between the photodetection areas 43 and 44 and the boundary line between the photodetection areas 45 and 46.

Figure 7:
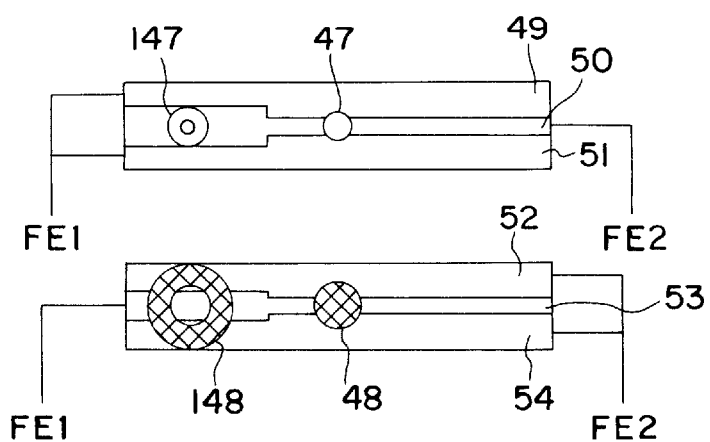
FIG. 7 is a view showing the diffracted light beam spots in the embodiment being virtually joined.

The quadrants of the divisional diffracted light beam spots 41a to 41d, 42a to 42[sic], 141a to 141d and 142a to 142d are shown in FIG. 7 being virtually joined for ease of explanation.

FIG. 7 is a view corresponding to FIG. 6(b). Reference numerals 47, 48, 147 and 148 represent diffracted light beam spots formed by joining the diffracted light beam spots 42a to 42d, 41a to 41d, 142a to 142d and 141a to 141d shown in FIG. 6(b), respectively.

In FIG. 7, reference numerals 49 to 54 represent detection areas. The detection area 49 corresponds to the detection area 43 shown in FIGS. 6(a) to 6(c). The detection area 50 corresponds to the detection areas 44 and 45. The detection area 51 corresponds to the detection area 46. The detection area 52 corresponds to the detection area 45. The detection area 53 corresponds to the detection areas 43 and 46. The detection area 54 corresponds to the detection area 44.

The focus error signal is obtained by the difference between the output FE1 of the detection areas 49, 51 and 53 and the output FE2 of the detection areas 50, 52 and 54 (FE1−FE2). Needless to say, the value of FE1−FE2 calculated in the above-described manner by use of the outputs of the detection areas shown in FIG. 7(a) and the value of FE1−FE2 calculated with FE1 and FE2 shown in FIGS. 6(a) to 6(c) by use of the outputs of the detection areas shown in FIGS. 6(a) to 6(c) are equivalent to each other.

FIG. 7 shows a case where a DVD is used as the optical disk 7.

Like in the first embodiment, in the spots formed by virtually joining the diffracted light beam spots on the surface of the photodetector 39, the spot areas for obtaining the DVD reproduction signal and the focus error signal can be made the same, so that the difference between the 0 of the focus error signal and the jitter of the reproduction signal do not significantly vary even if spherical aberration varies due to a variation in the base material thickness of the DVD.

In an experiment by the inventors of this application, the focus offset variation at 40 μm of the DVD could be suppressed to 0.2 μm or less.

When a CD is used as the optical disk 7, spherical aberration generated when a CD is reproduced is large in the spots 147 and 148 in the peripheral area of the polarization hologram 38 like in the first embodiment, so that most of the light beams are not incident on the detector 39.

Therefore, like in the first embodiment, FE1–FE2 can be made zero by appropriately selecting the minimum sizes (the lengths in the direction of the x-axis in FIG. 7) of the photodetection areas 50 and 53 in a range smaller than the diameter of the minimum spot.

In an experiment by the inventors of this application, the jitter of the information signal could be minimized when the focus error signal was 0 by making 20 μm the minimum size of the virtual photodetection area 50 in FIG. 7 under the condition where the diameter of the circle formed by virtually joining the diffracted light beam spots on the surface of the photodetector 39 was 40 μm.

While an example using the polarization anisotropic hologram as the hologram element was described in the above description, the present invention can be similarly carried out by using a hologram element not having polarization anisotropy.

While description was given only with respect to reproduction-only optical disks such as CDs and DVDs, the present invention can be similarly carried out for phase change optical disks, magneto-optic disks and recording-type optical disks using other materials.

(Third Embodiment)

Next, an optical head device according to a third embodiment of the present invention will be described.

This device is different from the optical head device of the second embodiment only in the polarization anisotropic hologram 38 in FIG. 4.

Hereinafter, the hologram pattern of the polarization anisotropic hologram 38 will be detailed.

Figure 13:
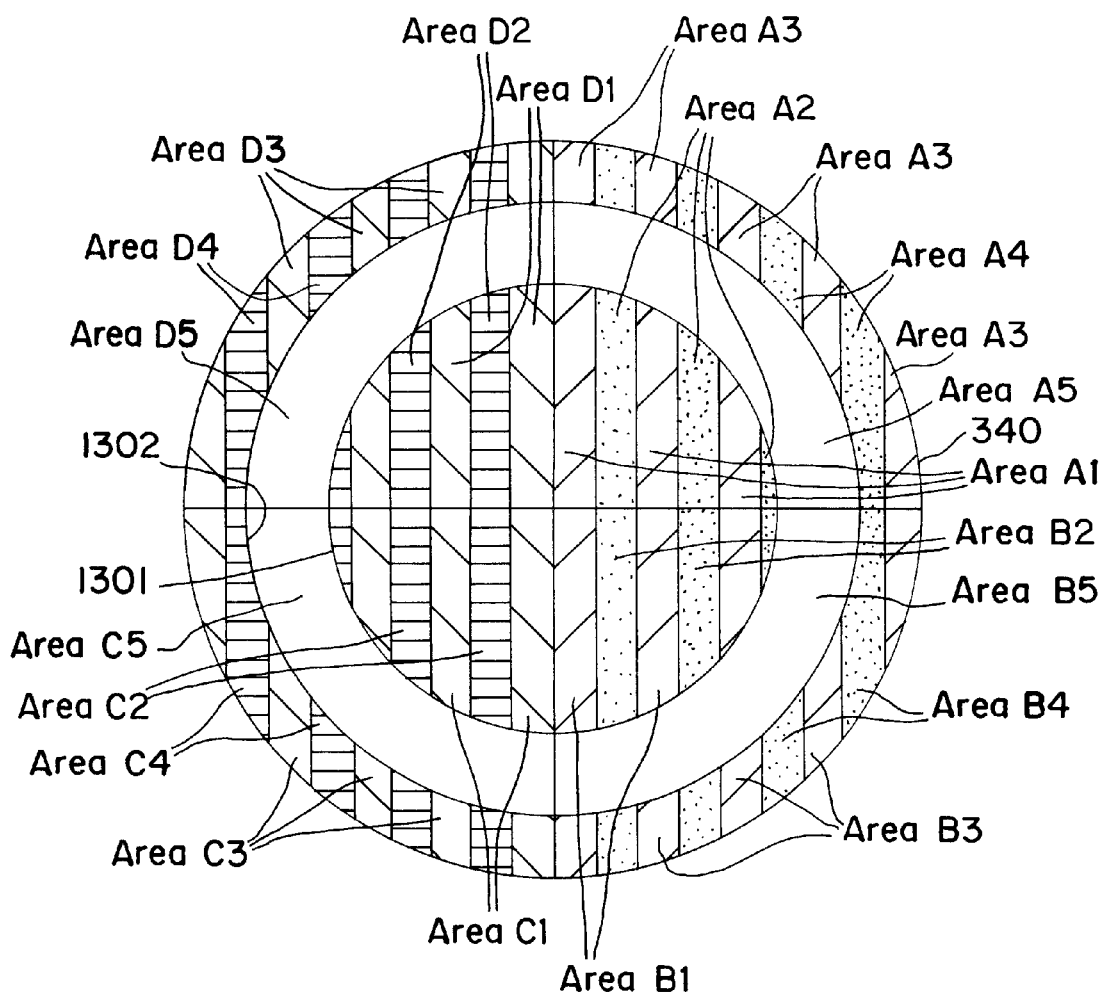
FIG. 13 is a hologram pattern view of a polarization anisotropic hologram according to a third embodiment of the present invention.

FIG. 13 is a view showing the hologram pattern of the polarization anisotropic hologram 38.

In FIG. 13, reference numeral 340 represents the hologram pattern. The hologram pattern 340 was formed by proton-replacing a lithium niobate substrate like that described in the second embodiment. The hologram pattern 340 can be regarded as being divided into quadrant groups as shown as groups of areas A1 to A5, areas B1 to B5, areas C1 to C5 and areas D1 to D5 in FIG. 13. Further, the hologram pattern 340 has its areas divided by concentric boundary lines 1301 and 1302 among the inside of the boundary line 1301, the outside of the boundary line 1302 and the part therebetween.

While in FIG. 13, the inside areas and the outside areas are provided with the same patterns in order to avoid complication of display of the figure, in actuality, they are different areas as mentioned above.

Description will be further given with the areas A1 to A5 in a quadrant as an example. As shown in the figure, the area A1 (hatched in the figure) and the area A2 (dotted in the figure) are areas inside the boundary line 1301, and are alternately disposed. The area A3 (hatched in the figure) and the area A4 (dotted in the figure) are areas outside the boundary line 1302, and are alternately disposed. The area A5 is an area sandwiched between the boundary lines 1301 and 1302. The areas in the other quadrants are disposed in a similar manner.

The size and disposition of the hologram pattern was decided so that light beams in a range of 0.5 to 0.6 in terms of the NA of the objective lens 6 pass through the areas A3, A4, B3, B4, C3, C4, D3 and D4, light beams of within 0.38 in terms of the NA of the objective lens 6 pass through the areas A1, A2, B1, B2, C1, C2, D1 and D2 and light beams in a range of 0.38 to 0.5 in terms of the NA of the objective lens 6 pass through the areas A5, B5, C5 and D5.

The spots, on the photodetector 39, of the diffracted light beams from the areas A1, A2 to D3 and D4 are similar to those of the second embodiment of the present invention. What is different from the second embodiment of the present invention is the diffracted light beams from the areas A5, B5, C5 and D5. The hologram pattern 340 is designed so that the diffracted light beams from the areas A5, B5, C5 and D5 are not incident on the photodetector 39.

Here, the first area of the present invention corresponds to the areas A1, A2, B1, B2, C1, C2, D1 and D2 of the hologram pattern 340 of FIG. 13. The second area of the present invention corresponds to the areas A3, A4, B3, B4, C3, C4, D3 and D4. The third area of the present invention corresponds to the areas A5, B5, C5 and D5.

In this case, it is desirable that the NA outside the first area (corresponding to the inside diameter of the third area) be 0.5 to 0.75 being the NA of the objective lens, and it is desirable that the NA inside the second area (corresponding to the outside diameter of the third area) be 0.75 to 1.0 being the NA of the objective lens. Therefore, in this embodiment, the values of the NA are set to 0.38 and 0.5, respectively.

These values are desirable because it is desirable to use for the focus signal the part outside 0.75 (NA0.45) in terms of the NA of the objective lens from the viewpoints that the maximum NA necessary for the spot diameter not to be too small when a CD is reproduced is approximately 0.75 (NA0.45) in terms of the NA of the objective lens and that the focus offset variation is reduced when a DVD is reproduced.

By using the hologram pattern 340, the reproduction jitter of CDs (so-called asymmetry defective disks) whose pit configurations are thick compared to those of general CDs can be improved while DVD characteristics similar to those of the second embodiment of the present invention are obtained.

Figure 14:
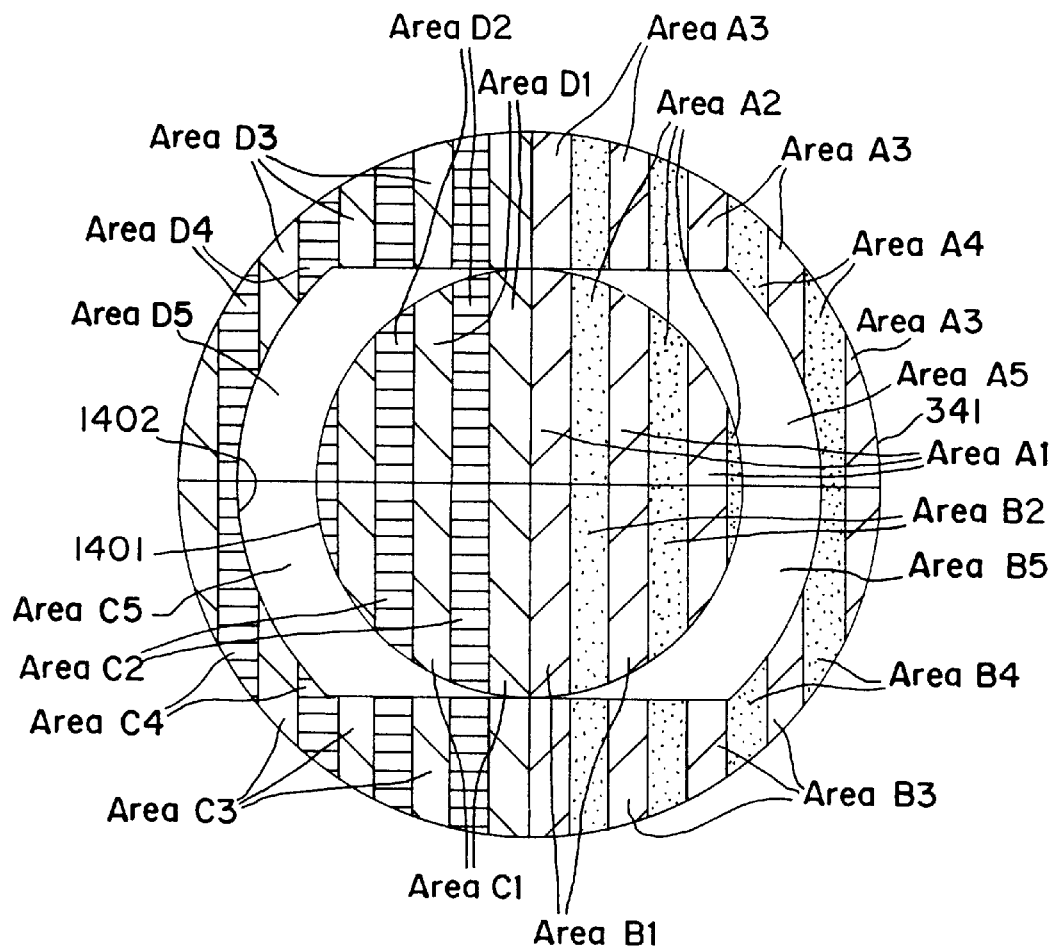
FIG. 14 is a view showing another example of the hologram pattern of the polarization anisotropic hologram according to the third embodiment of the present invention.

Likewise, in FIG. 14, a hologram pattern 341 is shown as another example of an improved pattern of asymmetry defective disks.

The hologram pattern 341 reduces, for asymmetry disks having thick pits, the optical resolving power of the optical pickup device in the direction of the radius of the CD compared to the optical resolving power in the direction of the circumference of the CD.

Like in the case of FIG. 13, the hologram pattern 341 can be regarded as being divided into quadrant groups as shown as groups of areas A1 to A5, B1 to B5, C1 to C5 and D1 to D5 in FIG. 14. Further, the hologram pattern 341 has its areas divided among the inside of a boundary line 1401, the outside of a boundary line 1402 and the part therebetween.

While in FIG. 14, the inside areas and the outside areas are provided with the same patterns in order to avoid complication of display of the figure, in actuality, they are different areas as mentioned above.

Description will be further given with the areas A1 to A5 in a quadrant as an example. As shown in the figure, the area A1 (hatched in the figure) and the area A2 (dotted in the figure) are areas inside the boundary line 1401, and are alternately disposed. The area A3 (hatched in the figure) and the area A4 (dotted in the figure) are areas outside the boundary line 1402, and are alternately disposed. The area A5 is an area sandwiched between the boundary lines 1401 and 1402. The areas in the other quadrants are disposed in a similar manner.

Figure 15:
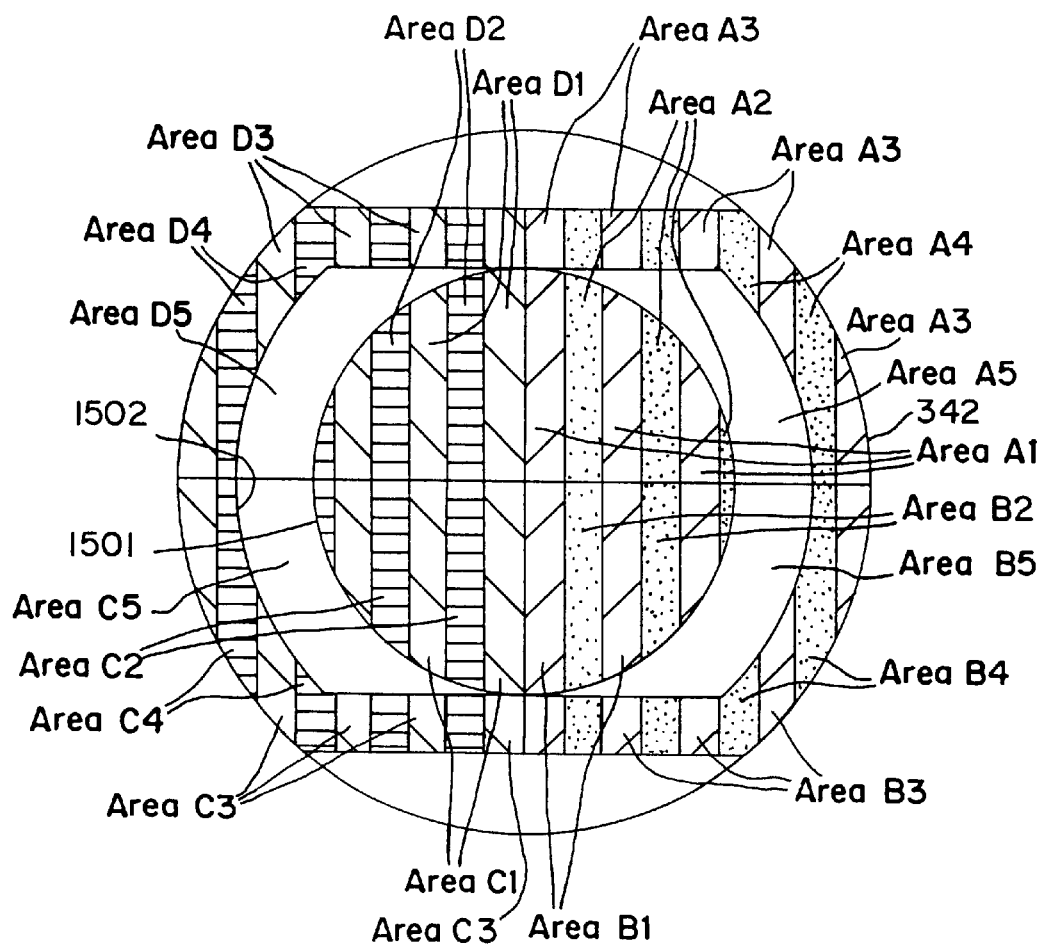
FIG. 15 is a view showing another example of the hologram pattern of the polarization anisotropic hologram according to the third embodiment of the present invention.

Likewise, in FIG. 15, a hologram pattern 342 is shown as yet another example of the improved pattern of the asymmetry defective disks.

Like the hologram pattern 341, the hologram pattern 342 reduces, for asymmetry disks having thick pits, the optical resolving power of the optical pickup device in the direction of the radius of the CD compared to the optical resolving power in the direction of the circumference of the CD.

The hologram pattern 342 can be regarded as being divided into areas A1 to A5, areas B1 to B5, areas C1 to C5 and areas D1 to D5 in FIG. 15. Further, the hologram pattern 342 has its areas divided among the inside of a boundary line 1501, the outside of a boundary line 1502 and the part therebetween. While in FIG. 15, the inside areas and the outside areas are provided with the same patterns in order to avoid complication of display of the figure, in actuality, they are different areas as mentioned above.

Description will be further given with the areas A1 to A5 as an example. As shown in the figure, the area A1 (hatched in the figure) and the area A2 (dotted in the figure) are areas inside the boundary line 1501, and are alternately disposed. The area A3 (hatched in the figure) and the area A4 (dotted in the figure) are areas outside the boundary line 1502, and are alternately disposed. The area A5 is an area sandwiched between the boundary lines 1501 and 1502. The other areas are disposed in a similar manner.

Further, the hologram pattern 342 reduces a turning-back-at-midpoint amount of the focus error signal of DVD two-layer disks.

Figure 16A:
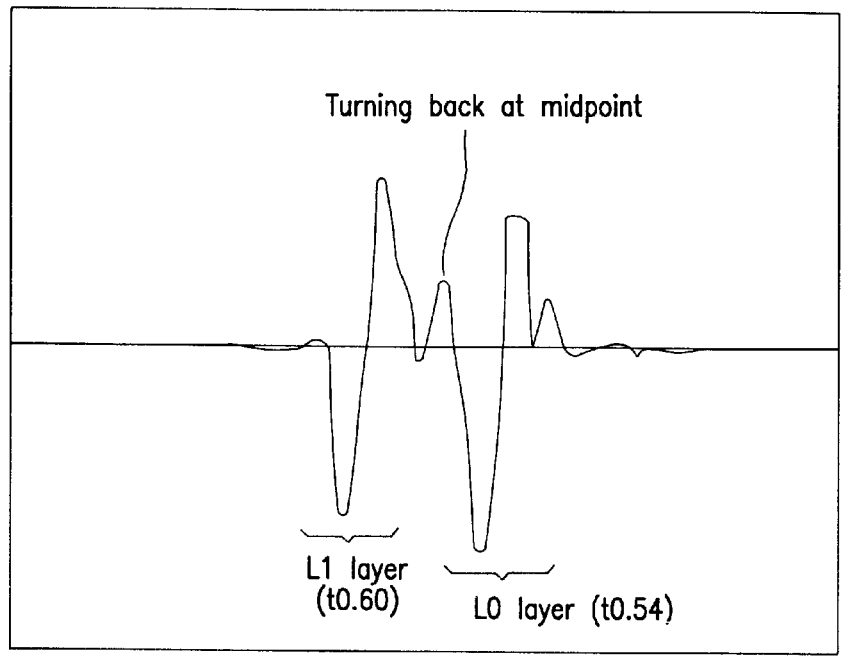
FIG. 16(a) is a view of assistance in explaining improvement in focus S letter in the third embodiment of the present invention, and shows the focus S letter of a base material thickness limited disk of a DVD two-layer disk by a hologram pattern 341.
Figure 16B:
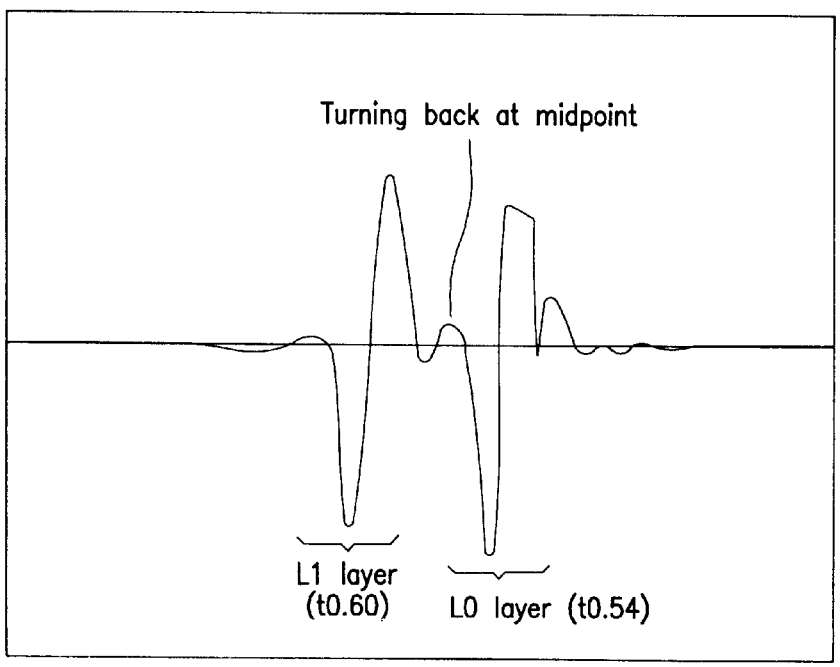
FIG. 16(b) is a view of assistance in explaining improvement in focus S letter in the third embodiment of the present invention, and shows the focus S letter of a base material thickness limited disk of a DVD two-layer disk by a hologram pattern 342.

FIGS. 16(*a*) and 16(*b*) show views for comparison of focus S letters in base material thickness limited disks of DVD two-layer disks (comparison for the hologram patterns 341 and 342).

In the figures, the horizontal axis represents the distance between the objective lens and the disk, and the vertical axis represents the focus error signal.

Here, the turning-back-at-midpoint amount in the figures will be described. That is, as shown in the figures, in two-layer disks, two focus signals are output being superimposed on each other with a distance therebetween. In that case, according to the hologram pattern, the focus signal (so-called S letter) corresponding to each layer turns back at the midpoint to become a pseudo S letter (pseudo focus error signal). This sometimes causes a malfunction in performing control.

On the contrary, the hologram pattern of the embodiment shown in FIG. 15 further reduces the turning back at the midpoint (see FIG. 16(*b*)), so that a malfunction in control can be reduced or prevented.

As described above, the present invention relates to an optical head device performing recording and reproduction or erasure of information on various types of optical disks such as optical media or magneto-optic media, for example, optical disks and optical cards, and more particularly, to an optical head device capable of performing recording and reproduction or erasure of information on various types of optical media or magneto-optic media where the distances from the substrate surfaces to the information recording surfaces are different, and produces effects as mentioned below.

That is, according to the first invention of this application, by making smaller the minimum size of the detection area of the diffracted light beam from the area close to the center of the optical axis of the hologram than the minimum diameter of the diffracted light beam spot, for an information medium whose distance from the substrate surface to the information recording surface, that is, base material thickness is different from that of an information medium having a standard base material thickness, focus position control of recording and reproduction spots can be performed so that the jitter of the information signal is minimized, and by using the diffracted light beam from the area far from the center of the optical axis of the hologram for focus detection and making the minimum size of the detection area lager than the minimum diameter of the diffracted light beam spots, a remarkable effect of reducing the focus offset variation due to a variation in the base material thickness of the information medium having the standard base material thickness is obtained.

Moreover, according to the second invention of this application, by making, of the divisional diffracted light beam spots, the position of the principal ray from the area close to the optical axis closer to the boundary between the photodetection areas, an effect equal to that of the first invention is obtained without the sizes of the photodetection areas being reduced, so that a remarkable effect is obtained when the photodetection areas cannot be reduced so much in order to prevent the frequency characteristic of the gain of the information signal from deteriorating.

Moreover, according to the sixth invention of this application, by providing an area where no diffracted light beam is incident on the photodetector for focus detection at the midpoint between the areas close to and far from the optical axis of the hologram, for an information medium whose distance from the substrate surface to the information recording surface, that is, base material thickness is largely different from that of an information medium having a standard base material thickness, particularly for one where the information pits are thick and the reproduction signal quality is poor, a remarkable effect of improving the signal quality by an appropriate optical frequency characteristic is obtained while an effect similar to that of the second invention of this application is obtained.

Moreover, according to the ninth invention of this application, by providing an area where no diffracted light beam is incident on the photodetector for focus detection in a range being large particularly in a direction vertical to the direction of the information pits at the midpoint between the areas close to and far from the optical axis of the hologram, like the sixth invention of the present invention, for an information medium whose distance from the substrate surface to the information recording surface, that is, base material thickness is largely different from that of an information medium having a standard base material thickness, particularly for one where the information pits are thick and the reproduction signal quality is poor, a remarkable effect of improving the signal quality by an appropriate optical frequency characteristic is obtained.

Moreover, according to the tenth invention of this application, by providing a semicircular area where no diffracted light beam is incident on the photodetector for focus detection in the area far from the optical axis of the hologram, a remarkable effect is obtained in the improvement of the focus signal quality at the base material thickness standard limit in an information medium having a standard base material thickness while an effect similar to that of the ninth invention of this application is obtained.

In the present invention, taking the above-described first embodiment as an example, the photodetector comprises the (first) photodetection group of the detection areas 32 to 34 and the (second) photodetection group of the detection areas 35 to 37. However, the present invention is not limited thereto; a different number of detection areas may be provided.

Moreover, in the above-described second embodiment, the areas close to and far from the optical axis of the diffraction element of the present invention correspond, for example, to the group of the areas A1, A2, B1, B2, C1, C2, D1 and D2 and the group of the areas A3, A4, B3, B4, C3, C4, D3 and D4, respectively.

Moreover, in the above-described second embodiment, a plurality of areas of the diffraction element of the present invention correspond, for example, to the group of the areas A1, A2, B1, B2, C1, C2, D1 and C2 and the group of the areas A3, A4, B3, B4, C3, C4, D3 and D4, respectively.

Moreover, in the above-described second embodiment, the diffraction element and the means for dividing the diffracted light beams of the present invention are integrally formed in the polarization anisotropic hologram 38. However, the present invention is not limited thereto; for example, they may be formed as separate members.

Moreover, the divisional diffracted light beam of the first diffracted light beam and the divisional diffracted light beam of the second diffracted light beam of the present invention correspond, for example, to the diffracted light beam spot 41a of a quadrant and the diffracted light beam spot 42a of a quadrant in the above-described second embodiment. However, the present invention is not limited thereto; they may be divided into a larger number of light beams and the number of divisional diffracted light beams is not limited.

Moreover, the boundary positions of the first and the second photodetection groups of the present invention correspond to the boundary between the detection areas 43 and 44 and the boundary between the detection areas 45 and 46 in the above-described second embodiment.

Moreover, in the above-described embodiments, a structure was described in which the collimator lens 3 and the quarter-wave plate 5 are used as an example of the converging optical system converging the diffracted light beam of the present invention and these are used also as the converging optical system for converging the light beam from the semiconductor laser 1. However, the present invention is not limited thereto; needless to say, the former converging optical system and the latter converging optical system may be separately formed, for example, in a case where the position of the light source and the position of the photodetector are different.

As is apparent from the above, the present invention has an advantage that the focus offset variation due to a variation in the base material thickness of an information medium having the standard base material thickness can be reduced while the focus offset in an information medium having a base material thickness largely different from the standard base material thickness is reduced.

Moreover, the present invention has an advantage that the degradation in quality of the focus signal due to a variation in the base material thickness of an information medium having the standard base material thickness can be reduced.

What is claimed is:

1. An optical head device comprising:
a diffraction element diffracting a light beam reflected from an information medium and being divided into a plurality of areas in a direction of a radius of a luminous flux of the light beam;
a converging optical system converging the diffracted light beam; and
a photodetector having a plurality of photodetection areas and detecting the converged diffracted light beam,
wherein (1) of a plurality of areas of said photodetector, a width of a photodetection area where a diffracted light beam from an area, close to a center of an optical axis of the light beam, of said diffraction element divided into a plurality of areas in the direction of the radius of the luminous flux of the light beam is detected is smaller than a minimum spot diameter of the diffracted light beam on said photodetector, and (2) of a plurality of areas of said photodetector, a width of a photodetection area where a diffracted light beam from an area, far from the center of the optical axis of the light beam, of said diffraction element divided into a plurality of areas is detected is equal to or larger than the minimum spot diameter of the diffracted light beam on said photodetector.

2. An optical head device comprising:
a diffraction element diffracting a light beam reflected from an information medium and being divided into a plurality of areas in a direction of a radius of a luminous flux of the light beam;
means for dividing the diffracted light beam;
a converging optical system converging the divided diffracted light beam; and
a photodetector having a plurality of photodetection areas and detecting the converged diffracted light beam,
wherein (1) a distance between a first position, in a plurality of photodetection areas, on which a principal ray of a divided diffracted light beam from an area, close to a center of an optical axis of the light beam, of a plurality of areas of said diffraction element is incident and a position of a boundary line between the photodetection area on which the divided principal ray is incident and another photodetection area adjoining the area is smaller than a radius of a minimum spot of a diffracted light beam that could be formed on said photodetector if the divided diffracted light beam were not divided, and (2) a distance between a second position, in a plurality of photodetection areas, on which a principal ray of a divided diffracted light beam from an area, far from the center of the optical axis of the light beam, of a plurality of areas of said diffraction element is incident and a position of a boundary line between the photodetection area on which the divided principal ray is incident and another photodetection area adjoining the area is equal to or larger than the radius of the minimum spot of the diffracted light beam that could be formed on said photodetector if the divided diffracted light beam were not divided.

3. An optical disk drive comprising: a diffraction element for diffracting a light beam reflected from an information medium into a plurality of diffracted beams in a radial direction of luminous flux of the light beam;
a converging optical system for converging the plurality of diffracted beams;
a photodetector having a plurality of photodetection areas for detecting the plurality of diffracted beams, wherein each of the diffracted beams forms a spot having a minimum spot diameter on the photodetection areas;
a first area of the plurality of photodetection areas receiving one of first and second diffracted beams of the plurality of diffracted beams, the first and second diffracted beams being diffracted from a location proximal to a center of an optical axis of the reflected light beam; and
a second area of the plurality of photodetection areas receiving one of third and fourth diffracted beams of the plurality of diffracted beams, the third and fourth diffracted beams being diffracted from a location distal from the center of the optical axis of the reflected light beam;

wherein (1) the first area has a first width dimension smaller than a minimum spot diameter of the one diffracted beam on the photodetector, and (2) the second area has a second width dimension equal to or larger than the minimum spot diameter of the one diffracted beam.

4. In an optical disk drive including a diffraction element for diffracting a light beam reflected from an information medium into a plurality of diffracted beams in a radial direction of luminous flux of the light beam; a converging optical system for converging the plurality of diffracted beams; and a photodetector having a plurality of photodetection areas for detecting the plurality of diffracted beams, wherein each of the diffracted beams forms a spot having a minimum spot diameter on the photodetection areas;

a method for reducing jitter of information from the information medium, comprising the steps of:

(a) forming a first area on the plurality of photodetection areas for receiving one of first and second diffracted beams of the plurality of diffracted beams, wherein the first and second diffracted beams are diffracted from a location proximal to a center of an optical axis of the reflected light beam;

(b) forming a second area on the plurality of photodetection areas for receiving one of second and third diffracted beams of the plurality of diffracted beams, wherein the second and third diffracted beams are diffracted from a location distal from the center of the optical axis of the reflected light beam;

(c) limiting the first area to a first width dimension smaller than a minimum spot diameter of the one diffracted beam on the photodetector; and (d) limiting the second area of a second width dimension equal to or larger than the minimum spot diameter of the one diffracted beam.

* * * * *

UNITED STATES PATENT AND TRADEMARK OFFICE
CERTIFICATE OF CORRECTION

PATENT NO.       : 6,400,671 B2
DATED            : June 4, 2002
INVENTOR(S)      : Hayashi et al.

It is certified that error appears in the above-identified patent and that said Letters Patent is hereby corrected as shown below:

Title page,
Item [56], References Cited, FOREIGN PATENT DOCUMENTS, insert -- 2-185,722, 7/20/90, Japan --.

Column 19,
Line 55, delete "head device" and insert -- disk drive --.

Column 20,
Line 13, delete "head device" and insert -- disk drive --.

Signed and Sealed this

Twelfth Day of August, 2003

JAMES E. ROGAN
*Director of the United States Patent and Trademark Office*